US007587683B2

(12) United States Patent
Ito et al.

(10) Patent No.: US 7,587,683 B2
(45) Date of Patent: Sep. 8, 2009

(54) DISPLAY METHOD, PORTABLE TERMINAL DEVICE, AND DISPLAY PROGRAM

(75) Inventors: Yuichi Ito, Tokyo (JP); Toshiyuki Chiba, Kanagawa (JP); Tatsuya Hama, Kanagawa (JP); Yukako Morimoto, Chiba (JP)

(73) Assignees: Sony Ericsson Mobil Communications Japan, Inc., Tokyo (JP); Sony Corporation, Tokyo (JP)

( * ) Notice: Subject to any disclaimer, the term of this patent is extended or adjusted under 35 U.S.C. 154(b) by 387 days.

(21) Appl. No.: 11/318,669

(22) Filed: Dec. 27, 2005

(65) Prior Publication Data
US 2006/0143574 A1    Jun. 29, 2006

(30) Foreign Application Priority Data
Dec. 28, 2004    (JP)    ............... P2004-379430
Dec. 28, 2004    (JP)    ............... P2004-379436
Dec. 28, 2004    (JP)    ............... P2004-379442

(51) Int. Cl.
G06F 3/048    (2006.01)
G06F 3/00    (2006.01)
G06F 15/177    (2006.01)
H04B 1/00    (2006.01)
(52) U.S. Cl. .............. 715/823; 715/715; 715/798; 715/800; 715/802; 715/852; 715/801; 715/810; 715/834; 715/856; 715/857; 715/821; 715/835; 715/841; 455/566
(58) Field of Classification Search ................ 715/823, 715/715, 798, 800, 802, 852, 801, 810, 834, 715/856, 857, 821, 835, 841; 455/566
See application file for complete search history.

(56) References Cited
U.S. PATENT DOCUMENTS

| 5,204,947 | A | * | 4/1993 | Bernstein et al. ............ 715/854 |
| 5,973,694 | A | * | 10/1999 | Steele et al. ................ 715/835 |
| 7,434,177 | B1 | * | 10/2008 | Ording et al. ............... 715/862 |
| 2001/0026291 | A1 | * | 10/2001 | Uchida ........................ 345/810 |
| 2002/0160817 | A1 | * | 10/2002 | Salmimaa et al. ........... 455/566 |
| 2003/0013493 | A1 | * | 1/2003 | Irimajiri et al. ............. 455/566 |
| 2004/0100479 | A1 | * | 5/2004 | Nakano et al. .............. 345/700 |
| 2005/0081164 | A1 | * | 4/2005 | Hama et al. ................ 715/830 |
| 2005/0235209 | A1 | * | 10/2005 | Morita et al. ............... 715/716 |
| 2006/0015823 | A1 | * | 1/2006 | Chao et al. ................. 715/823 |
| 2006/0020900 | A1 | * | 1/2006 | Kumagai et al. ............ 715/767 |
| 2006/0123360 | A1 | * | 6/2006 | Anwar et al. ............... 715/810 |
| 2006/0155684 | A1 | * | 7/2006 | Liu et al. ...................... 707/3 |

FOREIGN PATENT DOCUMENTS

JP    2002 196867        7/2002
JP    2006-031560    *   7/2004

* cited by examiner

Primary Examiner—Sy D Luu
Assistant Examiner—Linh K Pham
(74) Attorney, Agent, or Firm—Frommer Lawrence & Haug LLP; William S. Frommer; Thomas F. Presson

(57) ABSTRACT

A display method for displaying a plurality of icons in list form on a display device by a list-form displaying section and for enlarging and reducing an icon. When a first icon is selected while second icon previously selected is being enlarged, the second icon is enlarged to a predetermined size, and then after the enlargement, the enlarged second icon is reduced so as to have a size substantially equal to the size of each of icons which are not selected.

23 Claims, 14 Drawing Sheets

FIG. 6A      FIG. 6B      FIG. 6C
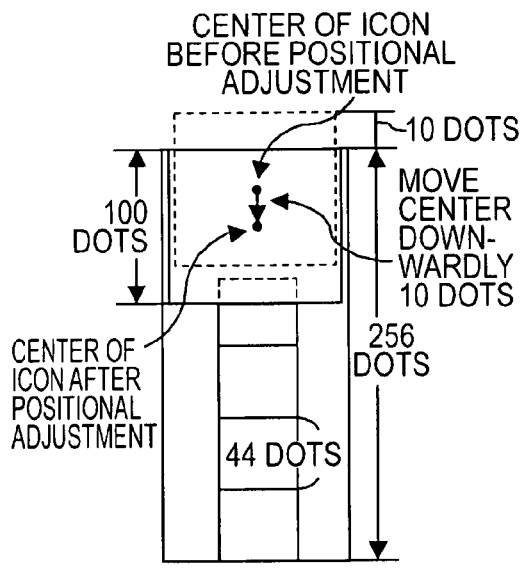 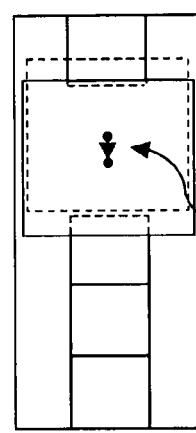 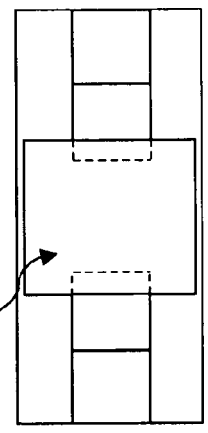
FIG. 6D      FIG. 6E
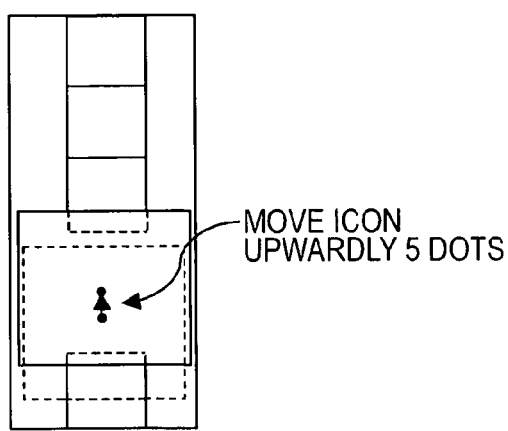 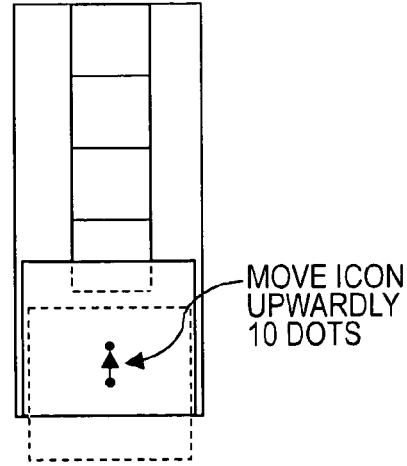

TOP MENU OF NEXT GROUP
(DISPLAYED AT LOW LUMINANCE)

TOP MENU OF NEXT GROUP
(DISPLAYED AT LOW LUMINANCE)

DISPLAY METHOD, PORTABLE TERMINAL DEVICE, AND DISPLAY PROGRAM

CROSS REFERENCES TO RELATED APPLICATIONS

The present invention contains subject matter related to Japanese Patent Application JP 2004-379430 filed in the Japanese Patent Office on Dec. 28, 2004, Japanese Patent Application JP 2004-379436 filed in the Japanese Patent Office on Dec. 28, 2004, and Japanese Patent Application JP 2004-379442 filed in the Japanese Patent Office on Dec. 28, 2004, the entire contents of which are incorporated herein by reference.

BACKGROUND OF THE INVENTION

1. Field of the Invention

The present invention relates to display methods and display programs suitable for use in, for example, cellular phones, PHS (personal handyphone system) devices, PDAs (personal digital assistants), and terminal devices such as notebook or desktop personal computers. The present invention also relates to portable terminal devices suitable for use in, for example, cellular phones, PDAs, notebook personal computers, etc.

2. Description of the Related Art

The information processing device disclosed in Japanese Unexamined Patent Application Publication No. 2002-196867 has been known as a cellular phone in which an item of a menu is selected by using a rotating operating unit.

The information processing device displays, on a display portion of an upper housing, an icon menu screen on which a plurality of icons are circularly arranged. In the information processing device, a rotating operation direction of a jog dial which is provided at a predetermined position of a lower housing and which can be clockwise or anticlockwise operated in a rotational manner coincides with a moving direction of a predetermined cursor indicating an arbitrary icon selected from a plurality of icons in an icon menu screen by using the jog dial, whereby a wrong operation on the jog dial is prevented to improve operability in an icon selecting mode.

In the case of a cellular phone of the related art, by moving a cursor to the display position of a desired icon, a desired function can be selected. The display color of the cursor is carefully selected such that a color different from the display color of each of icons is commonly used as the display color of the cursor so that the cursor itself can be easily identified by a user. However, since the icons are designed with a large number of display colors, the cellular phone of the related art has a problem in that, when the icon and the cursor have the same display color, or both have close display colors, identifying of an icon selected by the user is difficult, thus affecting operability.

SUMMARY OF THE INVENTION

It is desirable to provide a display method, a portable terminal device, and a display program which have operability improved by facilitating recognition of a menu being selected by a user.

According to an embodiment of the present invention, there is provided a display method including the steps of: displaying a plurality of icons in list form on a display means by a list-form displaying means; enlarging, by an enlarging means, to a predetermined size, one icon selected with an operating means by a user from the plurality of icons displayed on the display means; when a different icon is selected with the operating means by the user, by a reducing means, reducing the one icon selected and enlarged to the predetermined size so as to have a size substantially equal to the size of each of icons which are not selected; and controlling the enlarging means and the reducing means by a control means so that, when the different icon is selected by the user while the one icon selected by the user is being enlarged, the one icon selected is temporarily enlarged to the predetermined size, and immediately after the enlargement, the temporarily enlarged icon is reduced so as to have a size substantially equal to the size of each of icons which are not selected.

According to another embodiment of the present invention there is provided a portable terminal device including a list-form displaying means which displays a plurality of icons in list form on a display means, an enlarging means which enlarges, to a predetermined size, one icon selected with operating means by a user from the plurality of icons displayed on the display means by the list-form displaying means, a reducing means which, when a different icon is selected with the operating means by the user, reduces the one icon selected and enlarged to the predetermined size so as to have a size substantially equal to the size of each of icons which are not selected, and a control means which, when the different icon is selected by the user while the icon selected by the user is being enlarged by the enlarging means, controls the enlarging means to temporarily enlarge the one icon selected to the predetermined size, and which, immediately after the enlargement, controls the reducing means to reduce the temporarily enlarged icon so as to have a size substantially equal to the size of each of icons which are not selected.

According to another embodiment of the present invention, there is provided a display program for allowing a computer to function as: a list-form displaying means which displays a plurality of icons in list form on a display means; an enlarging means which enlarges, to a predetermined size, one icon selected with operating means by a user from the plurality of icons displayed on the display means by allowing the computer to function as the list-form displaying means; a reducing means which, when a different icon is selected with the operating means by the user, reduces the one icon selected and enlarged to the predetermined size so as to have a size substantially equal to the size of each of icons which are not selected; and a control means which, when the different icon is selected by the user while the one icon selected by the user is being enlarged by allowing the computer to function as the enlarging means, controls the enlarging means to temporarily enlarge the one icon selected to the predetermined size, and which, immediately after the enlargement, controls the reducing means to reduce the temporarily enlarged icon so as to have a size substantially equal to the size of each of icons which are not selected.

In the display method, portable terminal device, and display program according to the embodiments of the present invention, when a desired icon is selected from icons displayed in list form on the display means, the enlarging means enlarges the selected icon to a predetermined size, and the reducing means reduces the icon selected and enlarged to the predetermined size so that the icon selected and enlarged has a size substantially equal to the size of each of icons which are not selected. This makes it possible to display only the presently selected icon in enlarged form, thus enabling a user to easily identify the presently selected icon, so that improvement in operability can be achieved.

In addition, while the selected icon is being enlarged, when a different icon is selected, the control means controls the enlarging means to temporarily enlarge the originally selected icon to the predetermined size, and, immediately after the enlargement, the control means controls the reducing means to reduce the enlarged icon so as to have a size substantially equal to the size of each of the icons which are not selected. In other words, even when the different icon is selected while the icon is being enlarged, the enlargement is executed without being stopped, and, immediately after completing the enlargement, reduction is executed. Accordingly, when icons are consecutively, sequentially selected, animation display in which an icon is reduced in size immediately after being enlarged is executed along the sequentially selected icons. Therefore, this enables the user to easily recognize switching of selected icons, thus achieving improvement in operability.

According to another embodiment of the present invention, there is provided a display method including the steps of: displaying, by a menu displaying means, at least a plurality of upper menus in column form on a display means, displaying, in list form, along an arrangement direction of the plurality of upper menus displayed in column form, on the display means, lower menus of a menu group corresponding to a selected upper menu among a plurality of menu groups formed by grouping a plurality of lower menus corresponding to each of the plurality of upper menus, and displaying, on the display means, a cursor for selecting a desired menu from the plurality of upper menus or the lower menus belonging to the menu group; detecting, by a moving operation detecting means, a moving operation on the cursor from one of the plurality of upper menus to one of the lower menus, and a moving operation on the cursor from one of the lower menus to one of the plurality of upper menus, the moving operations being performed with an operating means by a user; and, when the moving operation on the cursor from one of the plurality of upper menus to one of the lower menus is detected in the step of detecting the moving operations on the cursor, displaying all the plurality of upper menus by a displaying processing means in a form moved to a side opposite to the lower menus, and, after moving and displaying the lower menus in a margin area formed by moving the plurality of upper menus, when the moving operation from one of the lower menus to one of the plurality of upper menus is detected by the moving operation detecting means, displaying, by the displaying processing means, the lower menus by moving all the lower menus to a side opposite to the plurality of upper menus, and displaying the plurality of upper menus by moving the plurality of upper menus into a margin area formed by moving the lower menus.

According to another embodiment of the present invention, there is provided a portable terminal device including: a menu displaying means which displays at least a plurality of upper menus in column form on a display means, and which displays, on the display means, in list form, along an arrangement direction of the upper menus displayed in column form, lower menus of a menu group corresponding to a selected upper menu among a plurality of menu groups which are each formed by grouping a plurality of lower menus corresponding to each of the upper menus, and displays, on the display means, a cursor for selecting a desired menu from the upper menus or the lower menus belonging to the menu group; a moving operation detecting means which detects a moving operation on the cursor from one of the upper menus to one of the lower menus, and a moving operation on the cursor from one of the lower menus to one of the upper menus, the moving operations being performed with operating means by a user; and a displaying processing means which displays all the upper menus in a form moved to a side opposite to the lower menus when the moving operation detecting means detects the moving operation on the cursor from one of the upper menus to one of the lower menus, and which, after moving and displaying the lower menus in a margin area formed by moving the upper menus, when the moving operation detecting means detects the moving operation from one of the lower menus to one of the upper menus, displays the lower menus by moving all the lower menus to a side opposite to the upper menus, and displays the upper menus by moving the upper menus into a margin area formed by moving the lower menus.

According to another embodiment of the present invention, there is provided a display program for allowing a computer to function as: a menu displaying means which displays at least a plurality of upper menus in column form on a display means, which displays, in list form, in an arrangement direction of the upper menus displayed in column form, on the display means, lower menus of a menu group corresponding to a selected upper menu among a plurality of menu groups which are each formed by grouping a plurality of lower menus corresponding to each of the upper menus, and displays, on the display means, a cursor for selecting a desired menu from the plurality of lower menus and the lower menus belonging to the menu group; a moving operation detecting means which detects a moving operation on the cursor from one of the upper menus to one of the lower menus and a moving operation on the cursor from one of the plurality of lower menus to one of the upper menus, the moving operations being performed with operating means by a user; and a displaying processing means which, when the moving operation on the cursor from one of the upper menus to one of the lower menus is detected by allowing the computer to function as the moving operation detecting means, displays the upper menus by moving all the upper menus to a side opposite to the lower menus, and which, when the moving operation on the cursor from one of the lower menus to one of the upper menus is detected by moving the lower menus into a margin area formed by moving the upper menus before displaying the moved lower menus and allowing the computer to function as the moving operation detecting means, displays the lower menus by moving all the lower menus to a side opposite to the plurality of upper menus, and displays the upper menus by moving the upper menus into a margin area formed by moving the lower menus.

In the display method, portable terminal device, and display program according to the embodiments of the present invention, when a moving operation on a cursor from one of upper menus to one of lower menus is detected, all the upper menus are moved to a side opposite to the lower menus and is displayed, and the lower menus are moved for display to a margin area formed by moving the upper menus. In addition, when a moving operation on the cursor is detected, all the lower menus are moved to a side opposite to the upper menus and is displayed, and the upper menus are moved for display to a margin area formed by moving the lower menus.

In other words, although the upper menus and the lower menus are simultaneously display in a display area, between the upper menus and lower menus, all menus which are not selected are moved to form a margin area, and the margin area is used to display all menus which are selected. This makes it possible to display the selected menus in prominent form.

BRIEF DESCRIPTION OF THE DRAWINGS

FIGS. 6A, 6B, 6C, 6D, and 6E are illustrations of adjustment of display positions of all icons in the case of enlarging an icon;

DESCRIPTION OF THE PREFERRED EMBODIMENTS

An embodiment of the present invention is applicable to cellular phones.

Configuration of Cellular Phone

Figure 1:
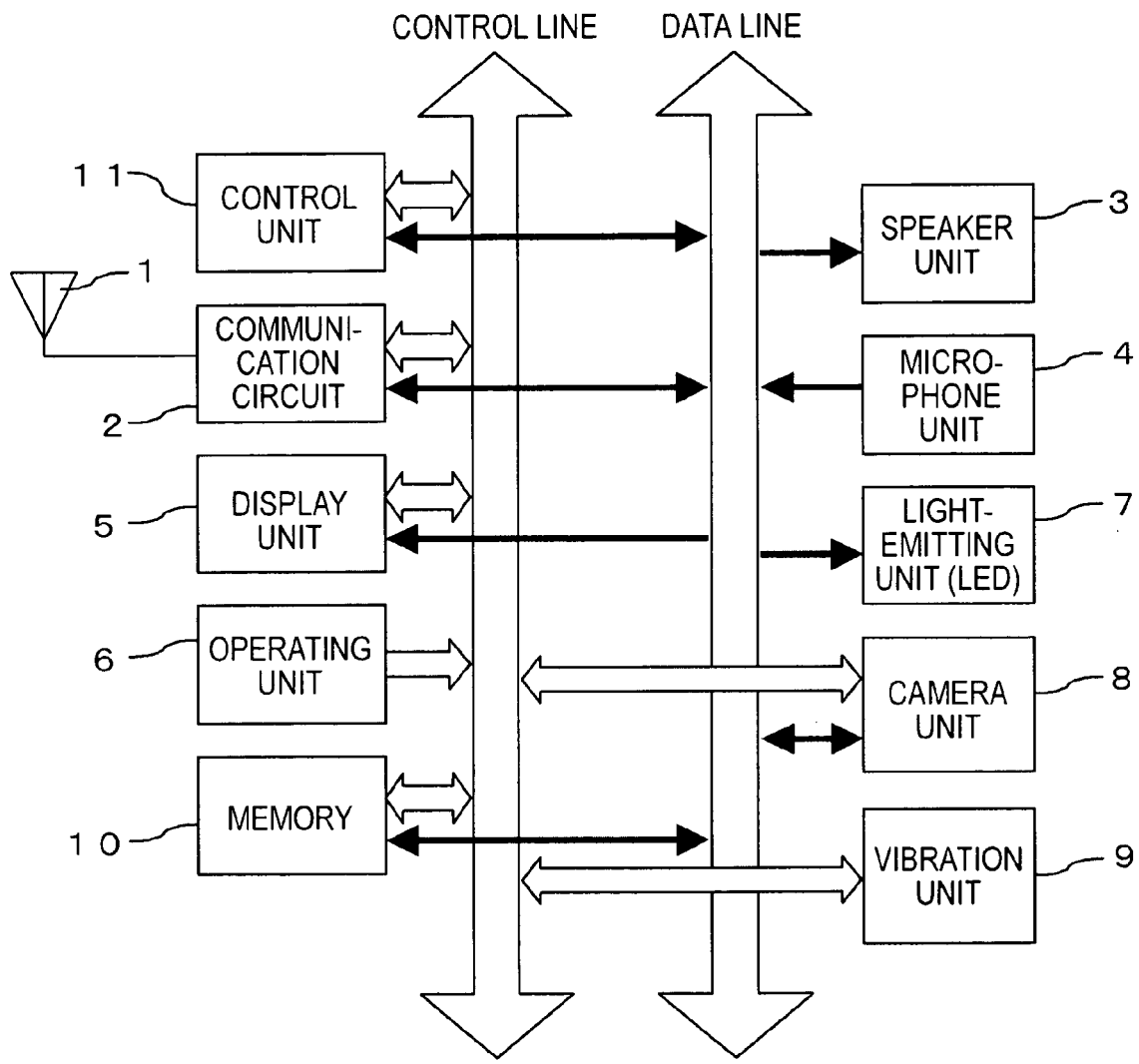
FIG. 1 is a block diagram showing a cellular phone according to an embodiment of the present invention.

FIG. 1 is a block diagram showing a cellular phone according to an embodiment of the present invention. As shown in FIG. 1, this cellular phone includes an antenna 1 and a communication circuit 2 which perform data transmission and reception with a base station connected to a communication network of a cellular phone operator, a speaker unit 3 for outputting audio such as a received sound, moving-picture-file audio, and music-data audio, a microphone unit 4 for collecting a transmitting sound, and a display unit 5 for displaying icons and a menu for selecting a function of the cellular phone as well as originating and incoming telephone numbers, a transmitting source, users' names as destinations, records of originating and incoming telephone calls and electronic mail, a phonebook, an address book, a schedule book, messages of sent and received electronic mail, etc.

This cellular phone also includes an operating unit 6 provided with a plurality of keys for inputting a desired telephone number and characters and selecting each icon and the menu, a light-emitting-device (LED) unit 7 that uses light to notify a user of an incoming call and transmission and reception of electronic mail, a camera unit 8 for capturing still and moving pictures of a desired subject, a vibration unit 9 that notifies the user of an incoming call and transmission and reception of electronic mail by vibrating the cellular phone, a memory 10 that stores a display program for displaying the icons and the menu as well as the records of originating and incoming telephone calls, the messages of the sent and received electronic mail, the phonebook, the address book, the schedule book, and a communication processing program (communication program), and a control unit 11 for controlling the operation of the cellular phone based on the communication processing program and the display program, etc.

Icons and Menu Groups

Figure 2:
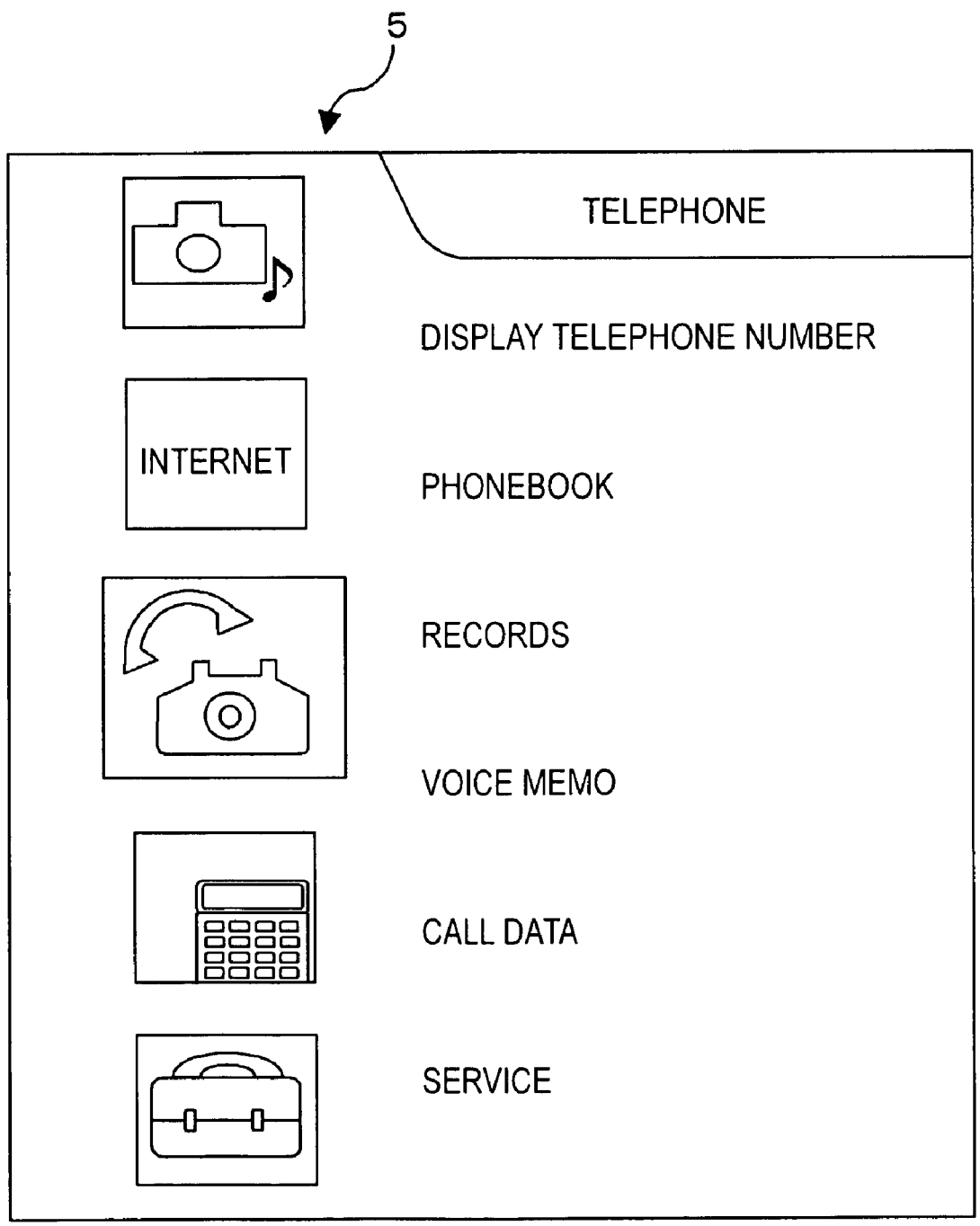
FIG. 2 is an illustration of a display screen of menus of the cellular phone according to the embodiment of the present invention.

In the case of the cellular phone according to this embodiment, the above icons are used as upper menus corresponding to menu groups formed by grouping a plurality of lower menus. By way of example, the above icons are designed to remind the user of functions, as shown in FIG. 2.

For example, in this case, an "Entertainment Menu" icon is designed with a camera image and a musical note image so as to remind the user of a camera function and a music player function. A "Network Connection Menu" icon is designed with the letters "INTERNET" so as to remind the user of a network connecting function.

A "Telephone Menu" icon is designed with a telephone-set image so as to remind the user of telephone-related functions such as displaying the telephone number of the cellular phone and displaying the phonebook. A "Tool Menu" icon is designed with an image of an electronic calculator or the like so as to remind the user of a schedule-book function and a calculating function. A "Setting Menu" icon is designed with an image of a toolbox or the like so as to remind the user of various settings.

As described above, each icon is an upper menu of grouped lower menus. The icons are displayed in column form along the longitudinal direction of the display unit 5, as shown in FIG. 5. In addition, a list of the lower menus of a menu group corresponding to the presently selected icon is displayed in the longitudinal direction of the display unit 5 in the vicinity of the column of the icons.

FIG. 2 shows an example in which the "Telephone Menu" icon is presently selected. In this case, the lower menus, such as "DISPLAY TELEPHONE NUMBER", "PHONEBOOK", "RECORDS (Incoming Call Record and Sending Call Record)", "VOICE MEMO (RECORD VOICE MEMO)", and "CALL DATA", are displayed adjacently to a column of the icons.

Functional Configuration of Control Unit 11

Figure 3:
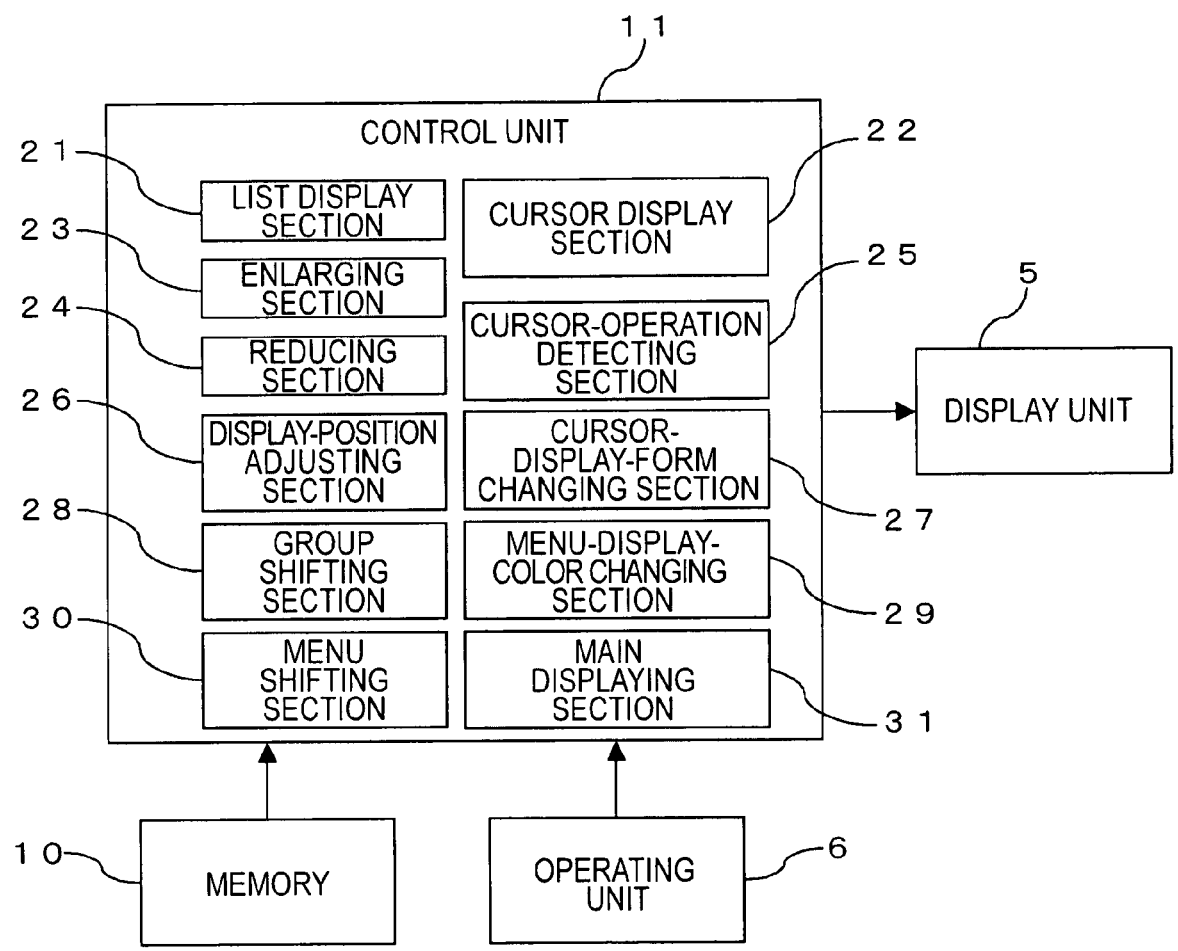
FIG. 3 is a functional block diagram showing a control unit of the cellular phone according to the embodiment of the present invention.

Next, FIG. 3 is a functional block diagram of the control unit 11 when it operates based on a display program stored in the memory 10.

As is understood from FIG. 3, the control unit 11 can operate as:

1) a list display section 21 that displays icons and menus in list form on the display unit 5 on the basis of the display program;
2) a cursor display section 22 that displays a cursor for selecting a desired icon or menu;
3) an enlarging section 23 that enlarges an icon selected by a user;
4) a reducing section 24 that reduces icons other than the icon selected by the user;

5) a cursor-operation detecting section 25 that detects a cursor moving operation performed by the user by detecting an operating state of the operating unit 6;

6) a display-position adjusting section 26 that adjusts the display position of each icon so that all the icons can be displayed on the display unit 5 even if the icon enlargement is performed;

7) a cursor-display-form changing section 27 that displays the cursor in a form with a visual effect activated so that, while the cursor is consecutively moved, the cursor looks moving at high speed;

8) a group shifting section 28 that, when icon selection is changed from the presently selected icon to a different icon, lower menus corresponding to the presently selected icon are scrolled to be hidden, and, instead, lower menus corresponding to the different icon are scrolled to appear;

9) a menu-display-color changing section 29 that changes the display color of a menu so that the menu can be viewed through the cursor;

10) a menu shifting section 30 that, when it is difficult to display the lower menus on a display area of the display unit 5 at a time, gradually displays, on the display area, lower menus that are not displayed; and 11) a main displaying section 31 that displays a menu selected by the user in larger size in a state in which display-positional relationships of the upper and lower menus are adjusted.

Exterior View of Cellular Phone

Figure 4:
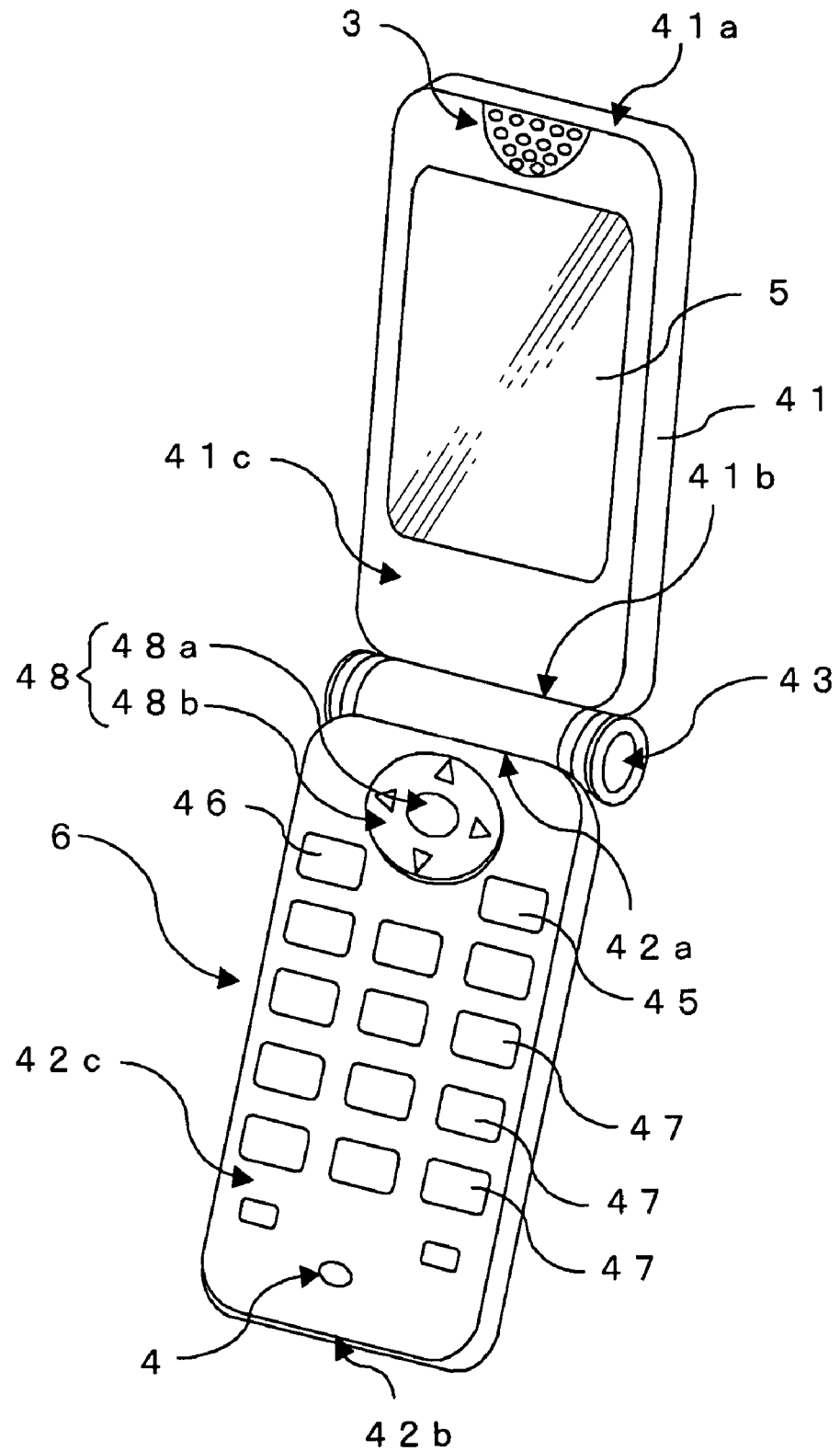
FIG. 4 is an exterior perspective view showing the cellular phone according to the embodiment of the present invention.

Next, the cellular phone according to this embodiment has the exterior view shown in FIG. 4. Referring to FIG. 4, this cellular phone is a so-called "folding cellular phone" in which, by using a hinge portion 43 to connect a lower end 41*b* of an upper housing 41 and an upper end 42*a* of a lower housing 42, the upper housing 41 can be freely revolved approximately 180 degrees from a closed state in which the upper housing 41 is substantially overlaid on the lower end 41*b* to an opened state in which the lower end 41*b* of the upper housing 41 and the upper end 42*a* of the lower housing 42 abut on each other.

In the upper housing 41, the display unit 5 is provided on the side of a top surface portion 41*c* which opposes a top surface portion 42*c* of the lower housing 42, and the speaker unit 3 is provided in the vicinity of an upper end 41*a* of the upper housing 41.

The lower housing 42 is provided with, on the top surface portion 42*c*, an on-hook key 45 and an off-hook key 46, and bottom operating portions 47 including numeric keys from zero to nine, an asterisk key, and a sharp key. The top surface portion 42*c* includes thereon a disk operating portion 48 in the vicinity of the hinge portion 43, and the microphone unit 4 in the vicinity of a lower end 42*b* of the lower housing 42.

The disk operating portion 48 has an enter key 48*a* on its central axis, and a cross key 48*b* coaxially provided with the enter key 48*a* so as to surround the enter key 48*a*. The cross key 48*b* can be vertically and horizontally pressed. The user can select upper menus or lower menus by horizontally pressing the cross key 48*b*, and can select a desired upper menu or lower menu from the selected upper or lower menus by vertically pressing the cross key 48*b*. This is described below.

Icon Enlargement/Reduction

Enlargement and Reduction of Icon Selected

In the case of the cellular phone according to this embodiment, when the control unit 11 detects a pressing operation on the enter key 48*a* (see FIG. 4) of the operating unit 6 in a state with a standby screen displayed on the display unit 5, the control unit 11 performs control to display, on the display unit 5, the icons of the upper menus, and the lower menus of the menu group corresponding to the presently selected upper menu.

Specifically, in the case of the cellular phone according to this embodiment, a total of five icons, that is, the "Entertainment Menu" icon, the "Network Connection Menu" icon, the "Telephone Menu" icon, the "Tool Menu" icon, and the "Setting Menu" icon, are provided as the icons of the upper menus. Accordingly, when the control unit 11 detects the pressing operation on the enter key 48*a* of the operating unit 6 in a state with the standby screen displayed on the display unit 5, the control unit 11 functions as the list display section 21 based on the display program. As shown in, for example, FIG. 2, the control unit 11 displays the five icons in column form and in list form in the left portion of the display area of the display unit 5 along the longitudinal direction of the display area. The control unit 11 also displays the lower menus of the menu group corresponding to the presently selected icon in list form in the right portion of the display area of the display unit 5 along an arrangement direction of the icons.

Next, the user selects an icon corresponding to a desired function by upwardly or downwardly pressing the cross key 48*b* in FIG. 4. In other words, a direction in which the cross key 48*b* is operated is along the arrangement direction of the icons. The user can upwardly operate the cross key 48*b* when selecting an icon displayed higher than the presently selected icon, and can downwardly operate the cross key 48*b* when selecting an icon lower than the presently selected icon.

Figure 5A:
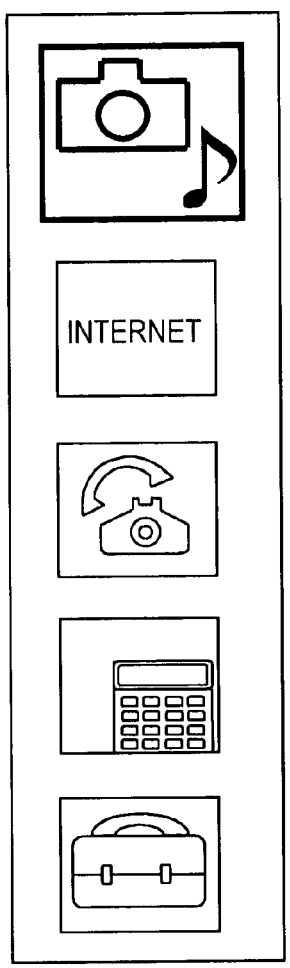
FIGS. 5A, 5B, and 5C are illustrations of enlargement of icons displayed by the cellular phone according to the embodiment of the present invention.
Figure 5B:
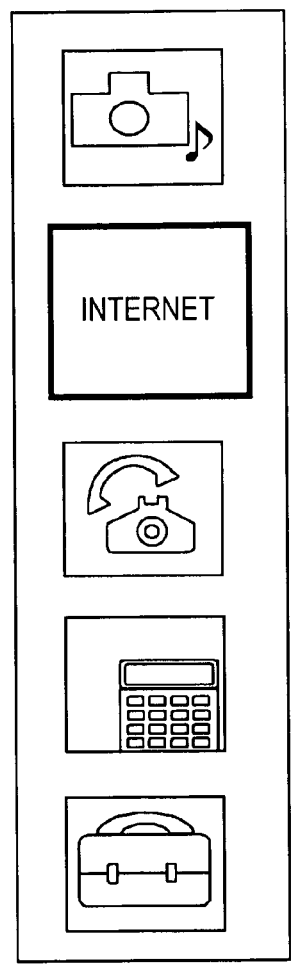
Figure 5C:
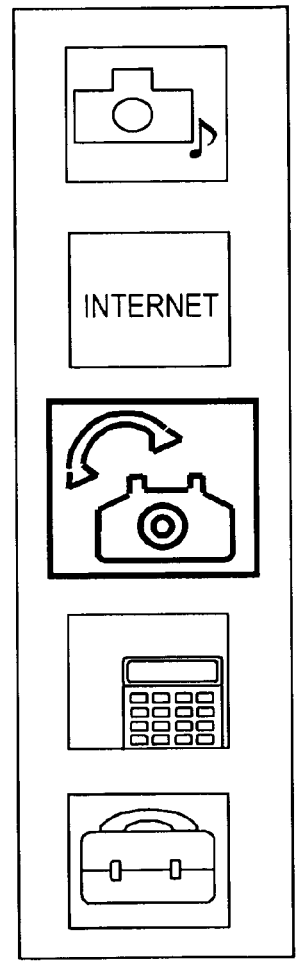

For example, FIG. 5A shows a state in which the "Entertainment Menu" icon is presently selected. In this state, by performing a downward pressing operation on the cross key 48*b*, whenever the control unit 11 detects the downward pressing operation, as shown in FIGS. 5A to 5C, the control unit 11 switches the selected icon in the order of the "Entertainment Menu" icon, the "Network Connection Menu" icon, the "Telephone Menu" icon, etc. FIGS. 5A to 5C show only the icons of the upper menus among the icons of the upper menus and the lower menus which are displayed on the display unit 5.

As is understood from FIGS. 5A to 5C, in the case of the cellular phone according to this embodiment, an icon is selected, the selected icon can be displayed in enlarged form.

Specifically, when the control unit 11 detects the icon selecting operation, it functions as the enlarging section 23 based on the display program. The control unit 11 performs calculation so that the length of each side of the icon, which is a quadrangle, is gradually extended, and performs control to display the gradually enlarged icon by performing drawing based on the result of the calculation. This makes it possible to display a linearly enlarged icon, so that the visibility of the selected icon can be improved for the user.

Alternatively, the control unit 11 performs calculation so that the area of the quadrangle icon can be linearly expanded, and performs control to display the gradually expanded icon by performing drawing based on the result of the calculation. This makes it possible to display the enlarged icon three-dimensionally, so that visibility can be improved.

Unlike the above, when a different icon is selected, the control unit 11 reduces the icon displayed in the enlarged form. This reduction can be performed simultaneously with the enlargement of the selected icon. In other words, based on the display program, the control unit 11 functions both as the enlarging section 23 and as the reducing section 24. The control unit 11 performs calculation so that each side of the quadrangle icon is gradually shortened, and draws the gradually reduced icon on the basis of the result of the calculation. Alternatively, the control unit 11 performs calculation so that the area of the quadrangle icon is linearly reduced, and draws the icon whose area is gradually reduced on the basis of the result of the calculation. This makes it possible to linearly reduce the selected icon, so that the visibility of the selected icon can be improved for the user.

Adjustment of Display Positions of Icons in Enlargement/Reduction

Next, when a display range for the above five icons has, for example, 256 vertical dots, and each side of the selected icon (to be displayed in enlarged form) is displayed using 100 dots, in order for the other four icons which are not selected to be displayed so as not to be superimposed on the display range, each side of each of the other four icons needs to be displayed using 39 dots (256 dots−100 dots÷4=39 dots). However, in the case of the cellular phone according to this embodiment, by adjusting the display position of each icon, the use of 44 dots to display each icon which is not selected is realized, thus also improving the visibility of the icon which is not selected.

Specifically, when the control unit 11 performs the icon enlargement and reduction, based on the display program, the control unit 11 functions both as the enlarging section 23 and as the reducing section 24, and, functions also as the display-position adjusting section 26.

When the control unit 11 functions as the display-position adjusting section 26, the control unit 11 causes each side of the selected icon to have 80 dots before determining the arrangement of the icons which are not selected. Next, the control unit 11 adjusts the central position of the selected icon, and subsequently enlarges the icon having 80 dots for each side to an icon having 100 dots for each side.

FIGS. 6A to 6E show the display positions of the other icons in accordance with the icon which is enlarged.

FIG. 6A shows the display positions of the other icons when the icon at the top is enlarged. In FIG. 6A, the icon indicated by the broken line indicates its display position when it is enlarged without being adjusted, and the icon indicated by the solid line indicates its display position when it is enlarged with adjustment. The comparison between the icon indicated by the broken line and the icon indicated by the solid line indicates that, when the top icon is enlarged, enlarging the top icon without performing positional adjustment causes a problem in that the enlarged icon upwardly shifts 10 dots from the display area.

Accordingly, when the control unit 11 enlarges the top icon, the control unit 11 functions as the display-position adjusting section 26 to perform display-position adjustment in which the central position of the enlarged top icon is downwardly shifted 10 dots, as shown in FIG. 6A. This makes it possible to display the enlarged icon in the display area when the top icon is displayed in enlarged form, and, in addition, the display in enlarged form can improve the visibility of the selected icon.

Next, FIG. 6B shows the display positions of the other icons when the second icon from the top is enlarged. In FIG. 6B, the icon indicated by the broken line indicates its display position when it is enlarged without being adjusted, and the icon indicated by the solid line indicates its display position when it is enlarged with adjustment. The comparison between the icon indicated by the broken line and the icon indicated by the solid line indicates that, when the second icon from the top is enlarged, enlarging the second icon from the top without performing positional adjustment causes a problem in that, since the enlarged second icon greatly overlaps with the top icon, it is difficult to recognize the top icon.

Accordingly, when the control unit 11 enlarges the second icon from the top, the control unit 11 functions as the display-position adjusting section 26 to perform display position adjustment in which the central position of the enlarged second icon is downwardly shifted five dots, as shown in FIG. 6B. This makes it possible to reduce an overlapping portion between the enlarged second icon and the top icon, so that, even if the top icon is displayed enlarged using 44 dots, its visibility can be improved.

Next, FIG. 6C shows the display positions of the other icons when the third icon from the top is enlarged. As is understood from FIG. 6C, the third icon from the top is displayed at an intermediate position of the display area. If this icon at the intermediate position of the display area is enlarged, it less overlaps with the second icon from the top and the second icon from the bottom. Accordingly, when the control unit 11 enlarges the third icon from the top, the control unit 11 enlarges the third icon and directly displays the enlarged icon without adjusting the display positions. Also in this case, the enlarged icon and the other icons can be displayed with good visibility.

Next, FIG. 6D shows the display positions of the other icons when the second icon from the bottom is enlarged. In FIG. 6D, the icon indicated by the broken line indicates its display position when it is enlarged without being adjusted, and the icon indicated by the solid line indicates its display position when it is enlarged with adjustment. The comparison between the icon indicated by the broken line and the icon indicated by the solid line indicates that, when the second icon from the bottom is enlarged, enlarging the second icon from the bottom without performing positional adjustment causes a problem in that, since the enlarged icon greatly overlaps with the bottom icon, it is difficult to recognize the bottom icon.

Accordingly, when the control unit 11 enlarges the second icon from the bottom, the control unit 11 functions as the display-position adjusting section 26 to perform display position adjustment in which the central position of the enlarged icon is upwardly shifted five dots, as shown in FIG. 6D. This makes it possible to reduce an overlapping portion between the enlarged icon and the bottom icon, so that, even if the bottom icon is displayed enlarged using 44 dots, its visibility can be improved.

Next, FIG. 6E shows the display positions of the other icons when the bottom icon is enlarged. In FIG. 6E, the icon indicated by the broken line indicates its display position when it is enlarged without being adjusted, and the icon indicated by the solid line indicates its display position when it is enlarged with adjustment. The comparison between the icon indicated by the broken line and the icon indicated by the solid line indicates that, when the bottom icon is enlarged, enlarging the bottom icon without performing positional adjustment causes a problem in that the enlarged icon downwardly shifts 10 dots from the display area.

Accordingly, when the control unit 11 enlarges the bottom icon, the control unit 11 functions as the display-position adjusting section 26 to perform display-position adjustment in which the central position of the enlarged top icon is upwardly shifted 10 dots, as shown in FIG. 6E. This makes it possible to display the enlarged icon in the display area when the bottom icon is displayed in enlarged form, and, in addition, the display in enlarged form can improve the visibility of the selected icon.

Flow of Display Process

Figure 7:
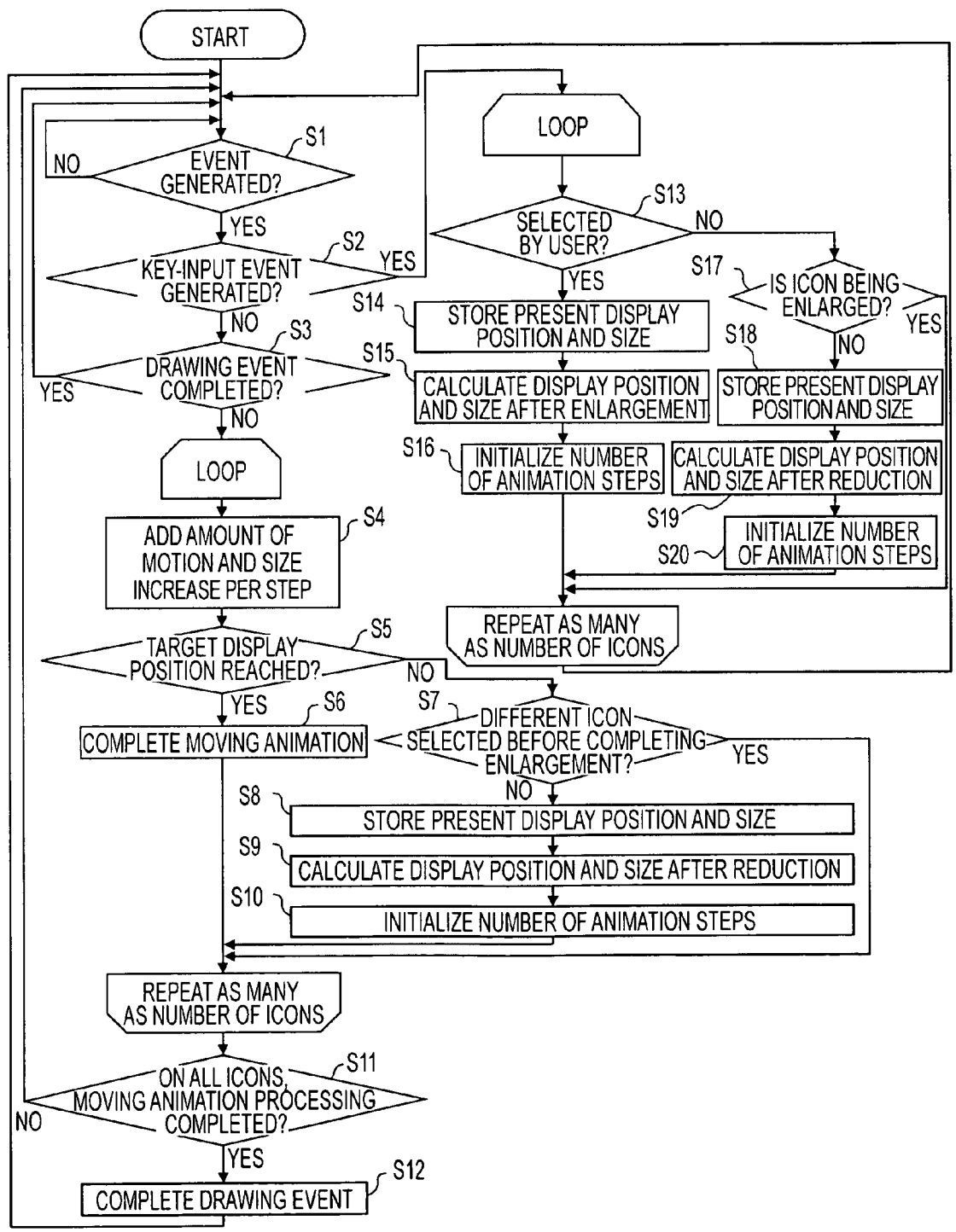
FIG. 7 is a flowchart showing the flow of icon enlargement in the cellular phone according to the embodiment of the present invention.

Next, in the case of the cellular phone according to this embodiment, the control unit 11 can execute, in accordance with the flowchart shown in FIG. 7, calculating the display positions of the icons in the menu screen, etc., and drawing. In the flowchart in FIG. 7, in step S1, the control unit 11 determines whether an event that is generated in each fixed time such as, for example, 50 milliseconds, has been generated. The process proceeds to step S1 with timing that the generation of this event is detected.

In step S2, the control unit 11 determines whether a key-input event has been generated which is generated such that the user upwardly or downwardly presses the cross key 48b, as described above. If the key-input event has been generated, the control unit 11 proceeds to step 13. If the key-input event has not been generated, the control unit 11 proceeds to step S3.

In other words, in processing in steps S1 to S3, in the case of the cellular phone according to this embodiment, the control unit 11 can receive a key-input event which is generated such that the user upwardly or downwardly presses the cross key 48b at intervals (approximately 150 milliseconds) of a minimum of three events. Key input by the user can be received at intervals of 150 milliseconds. If the control unit 11 receives the key-input event, the control unit 11 executes the received key-input event in steps S13 to S19. If the control unit 11 does not receive any key-input event, the control unit 11 can execute a drawing event several times in step S4 to S10 (described below) from reception of the key-input event to reception of the next key-input event.

In other words, the control unit 11 performs monitoring concerning whether the above key input has been performed every 150 milliseconds. If the control unit 11 detects the key input, the control unit 11 executes the key-input event shown in steps S13 to S19. Alternatively, if the control unit 11 does not detect the key input within 150 milliseconds, in step S3, the control unit 11 determines whether a drawing event has been completed which is performed after receiving the key-input event until receiving the next key-input event, as described above. If the drawing event has been completed, the control unit 11 returns to step S1 in order to receive key input again. If the drawing event has not been completed, the control unit 11 proceeds to step S4 in order to continuously execute the drawing.

Next, when the drawing event is executed after receiving the key-input event until receiving the key-input event, the control unit 11 proceeds to step S4. Processing in steps S4 to S10 is loop processing, and can be repeatedly executed correspondingly to the number of icons (in this case, the number of icons=a number of times the processing is repeatedly executed=5).

In other words, when the execution of the drawing event is started, in step S4, the control unit 11 calculates an amount of motion and size increase per step on the basis of the display position of an icon that is subject to this process, the present size of this icon, a position (target display position) at which this icon is displayed by the process, a target size of this icon, and the number of steps (animation steps) needed to enlarge this icon to the target size. For the present display position of this icon being processed and the present size of this icon, the calculated amount of motion and size increase per step are added, and the process proceeds to step S5.

In step S5, the control unit 11 determines whether the display position and size of the icon being processed have reached the target display position and size as the result of the above addition. If it is determined that the display position and size of the icon being processed have reached the target display position and size, the process proceeds to step S6, and the processing (moving animation processing) on the icon is completed.

If it is determined the display position and size of the icon being processed have not reached the target display position and size, the control unit 11 proceeds to step S7, and, before the enlargement of the icon is not completed, the control unit 11 determines whether a selecting operation on a different icon has been performed.

When the icon being presently processed is identified as an icon that is not selected by the user and it is determined that enlargement of this icon is not completed, the control unit 11 returns to step S4. In step S4, the control unit 11 adds again the calculated amount of motion and size increase per step to the present display position and size of the icon subject to the process. In step S5, the control unit 11 determines again whether the display position and size of the icon subject to the processing have reached the target display position and size.

If, in step S7, it is determined that icon being presently processed is identified as an icon that is not selected by the user and it is determined that the enlargement of this icon is not completed, by repeatedly executing each of steps S7, S4, and S5, even if the different icon is selected during the enlargement, the originally selected icon is temporarily enlarged to a predetermined size. The icon enlarged in the above manner is an icon which is not selected by the user, and which should be basically reduced and displayed at a corresponding display position after being reduced. At the time the different icon is selected by the user, the display position of the originally selected icon changes to a different display position.

If the originally selected icon that is temporarily enlarged to the predetermined size is enlarged as described above, the display position of the originally selected icon does not reach the target display position. Accordingly, in step S5, the control unit 11 determines that the originally selected icon enlarged to the predetermined size does not reach the target display position. Also, in step S7, the control unit 11 determines that the enlargement has been completed, and proceeds to step S8. In steps S8 to S10, the temporarily enlarged icon is reduced to the predetermined size.

In other words, in step S8, the control unit 11 temporarily stores the present display position and size of the enlarged icon, and proceeds to step S9. In step S9, the control unit 11 calculates the display position and size of the icon when it is reduced, and proceeds to step S10. In step S10, the control unit 11 initializes the number of the above animation steps, and returns to step S4.

In step S4, by adding the calculated display position and size (both values are negative) of the icon when it is reduced to the present display position and size of the enlarged icon which are stored in step S8, the control unit 11 performs reduction and display-position movement on the enlarged icon for one animation step. This reduction is repeatedly executed until, in step S5, the above icon is reduced and is determined to be displayed at the target display position.

In step S11, the control unit 11 determines whether the processing (moving animation processing) in steps S4 to S10 on each of the five icons has finished. If the control unit 11 has determined that the processing on each of the five icons has finished, in step S12, the drawing event processing is completed.

If, in step S11, it is determined that the processing on each of the five icons has not finished, the control unit 11 returns to step S1, and performs the moving animation processing on the remaining icons on which the moving animation processing has not been performed yet.

When, in step S2, the generation of the key-input event is detected, the control unit 11 proceeds to step S13 and executes the key-input event. The key-input event in steps S13 to S20 is loop processing and is repeatedly executed correspondingly to the number of icons.

In other words, after initiating the execution of the key-input event, in step S13, the control unit 11 determines whether an icon to be processed has been selected by the user. If the icon to be processed has been selected by the user, the control unit 11 proceeds to step S14. If the icon to be processed has not been selected by the user, the control unit 11 proceeds to step S17.

Proceeding to step S14 after determining that the icon to be processed has been selected by the user, the control unit 11 temporarily stores the present display position and size of the icon in order to execute the enlargement of the icon, and proceeds to step S15. In step S15, the control unit 11 calculates the amount of motion and size increase per step on the basis of the present display position and size of the icon, a position (target display position) at which the icon is displayed and a target size of the icon, and the number of steps (animation steps) needed to enlarge the icon to the target size.

Proceeding to step S17 after determining that the icon to be processed has not been selected, in step S17, the control unit 11 determines whether the icon to be processed has been selected and is being enlarged. If it is determined that the icon to be processed is not being enlarged, the control unit 11 returns to step S13 since the control unit 11 does not need to execute enlargement or reduction.

If it is determined that the icon is being enlarged, the control unit 11 proceeds to step S18 and temporarily stores the present display position and size of the icon. In step S19, the control unit 11 calculates the display position and size of the icon when it is reduced. In step S20, the control unit 11 initializes the animation steps.

The key-input event processing shown in steps S13 to S20 is repeatedly executed correspondingly to the number of the five icons. Based on the display position and size calculated in the key-input event, in the drawing event shown in steps S4 to S10, the display position and size of each icon are determined and the icon is drawn.

As described above, in the cellular phone according to this embodiment, calculation of the display position of each icon, etc., on the menu screen and the drawing can be executed by an event that is generated for each predetermined time. In other words, the display position and size of the icon are calculated beforehand by the key-input event, and, by designating a number of times the drawing is performed in the drawing event for displaying an icon at a target display position, during a drawing event generated between key-input events, icon drawing is performed based on the results of calculation during the drawing event.

In addition, by using the display position and size of an icon being drawn as the present values and performing re-calculation of the next target display position and size, a key-input event can be received even if an icon is being drawn.

Since event information, such as the display position and size of each icon, is managed separately for the icon, each type of processing, such as enlargement, reduction, and movement, can separately be performed on the icon. Therefore, it may be said that a plurality of jobs can simultaneously be executed, such as, while an icon is being enlarged, selecting a different con, and changing a menu to be selected from an upper menu to a lower menu.

In addition, by storing variables representing the states of all icons, in all the menus, an unauthorized event is prevented from being generated.

Displaying Lower Menus when Selecting Icon

Next, in the cellular phone according to this embodiment, when the presently selected icon is changed to a different icon, lower menu display switching can be performed in accordance with the icon change from a lower menu of a menu group corresponding to the presently selected icon to a lower menu of a menu group corresponding to a newly selected icon.

Figure 8A:
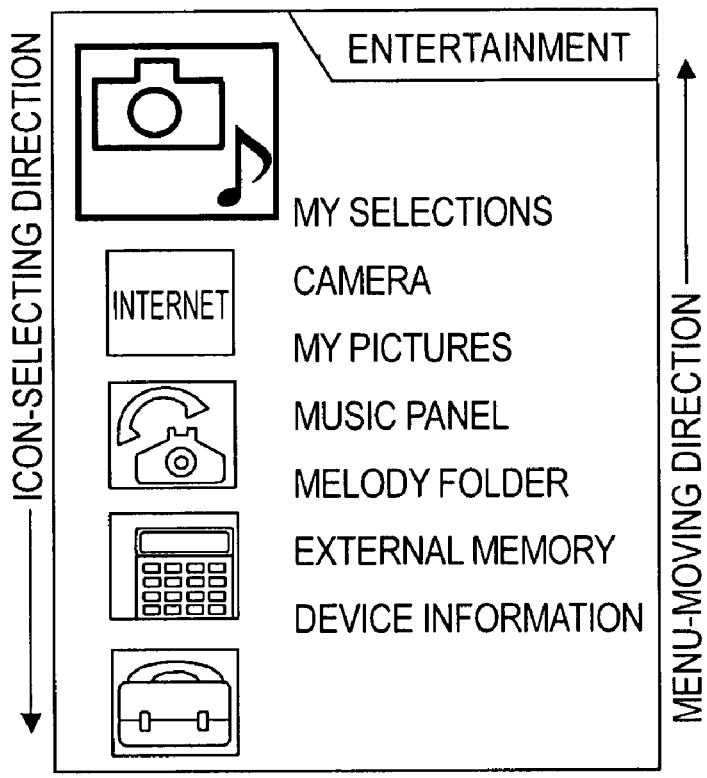
FIGS. 8A and 8B are illustrations of lower menus corresponding to a selected icon which are displayed with the icon in the cellular phone according to the embodiment of the present invention.
Figure 8B:
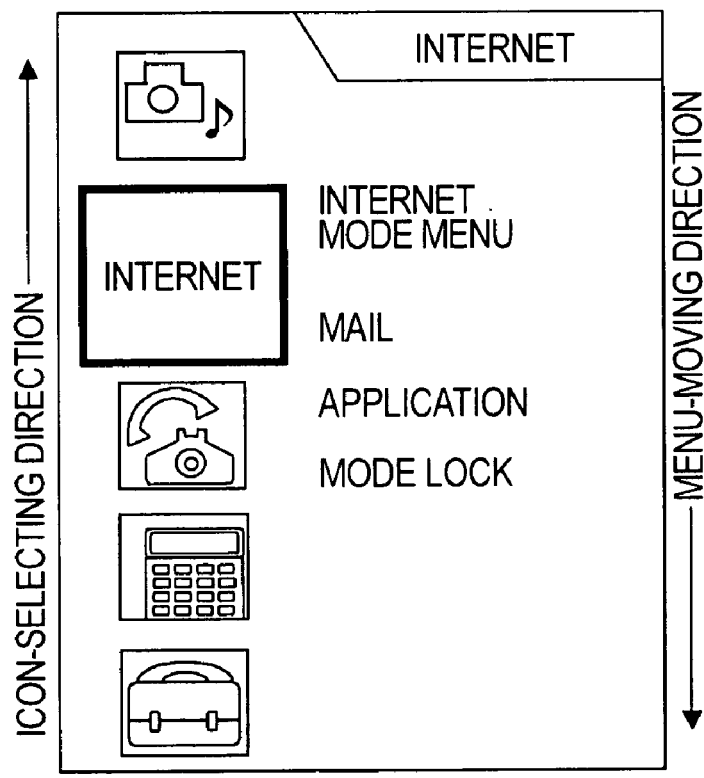

FIG. 8A shows a case in which an "ENTERTAINMENT" icon is selected. In this case, lower menus, such as MY SELECTIONS, CAMERA, MY PICTURES, MUSIC PANEL, MELODY FOLDER, EXTERNAL MEMORY, and DEVICE INFORMATION, of a menu group corresponding to the "ENTERTAINMENT" icon are displayed as lower menus. FIG. 8B shows a case in which the "INTERNET" icon is newly selected. When the selected icon is changed as described above, based on the display program, the control unit 11 functions as the list display section 21 to switch lower menus to be displayed from the lower menus of the menu group corresponding to the originally displayed "ENTERTAINMENT" icon to lower menus, such as INTERNET MODE MENU, MAIL, and APPLICATION, of a menu group corresponding to the "ENTERTAINMENT" icon.

In addition, the control unit 11 functions as the list display section 21, whereby, when switching the lower menus to be displayed, the lower menus corresponding to the newly selected icon are displayed so that they are initially moved at high speed and are moved at gradually decreasing speed before being finally stopped.

For example, the selected icon is changed from the "ENTERTAINMENT" icon to the "INTERNET" icon, as denoted by the upward arrow in FIG. 8A, the control unit 11 that functions as the list display section 21 hides the lower menus corresponding to the "ENTERTAINMENT" icon in frame-out form by upwardly moving them at high speed out of the display area. The lower menus corresponding to the "INTERNET" icon are displayed while being pulled by the upwardly moved lower menus. Accordingly, the lower menus corresponding to the "INTERNET" icon are displayed so that they enter the display area from its bottom, following the lower menus moved out of the display area, and move at gradually decreasing speed before being finally stopped.

Similarly, when the selected icon is changed from "TELEPHONE" to "INTERNET", as denoted by the downward arrow in FIG. 6B, the control unit 11 that functions as the list display section 21 hides the lower menus of the "TELEPHONE" icon by downwardly moving them at high speed out of the display area. Lower menus corresponding to the "INTERNET" icon are displayed while being pulled by the lower menus downwardly moved out of the display area. Accordingly, the lower menus corresponding to the "INTERNET" icon are displayed so that they enter the display area from its top, following the lower menus downwardly moved out of the display area, and are moved at gradually decreasing speed before being finally stopped.

When the selected icon is consecutively selected, the control unit 11 functions as the list display section 21, lower menus corresponding to each icon are gradually displayed at high speed in response to the time of the consecutively selecting operation.

Figure 9:
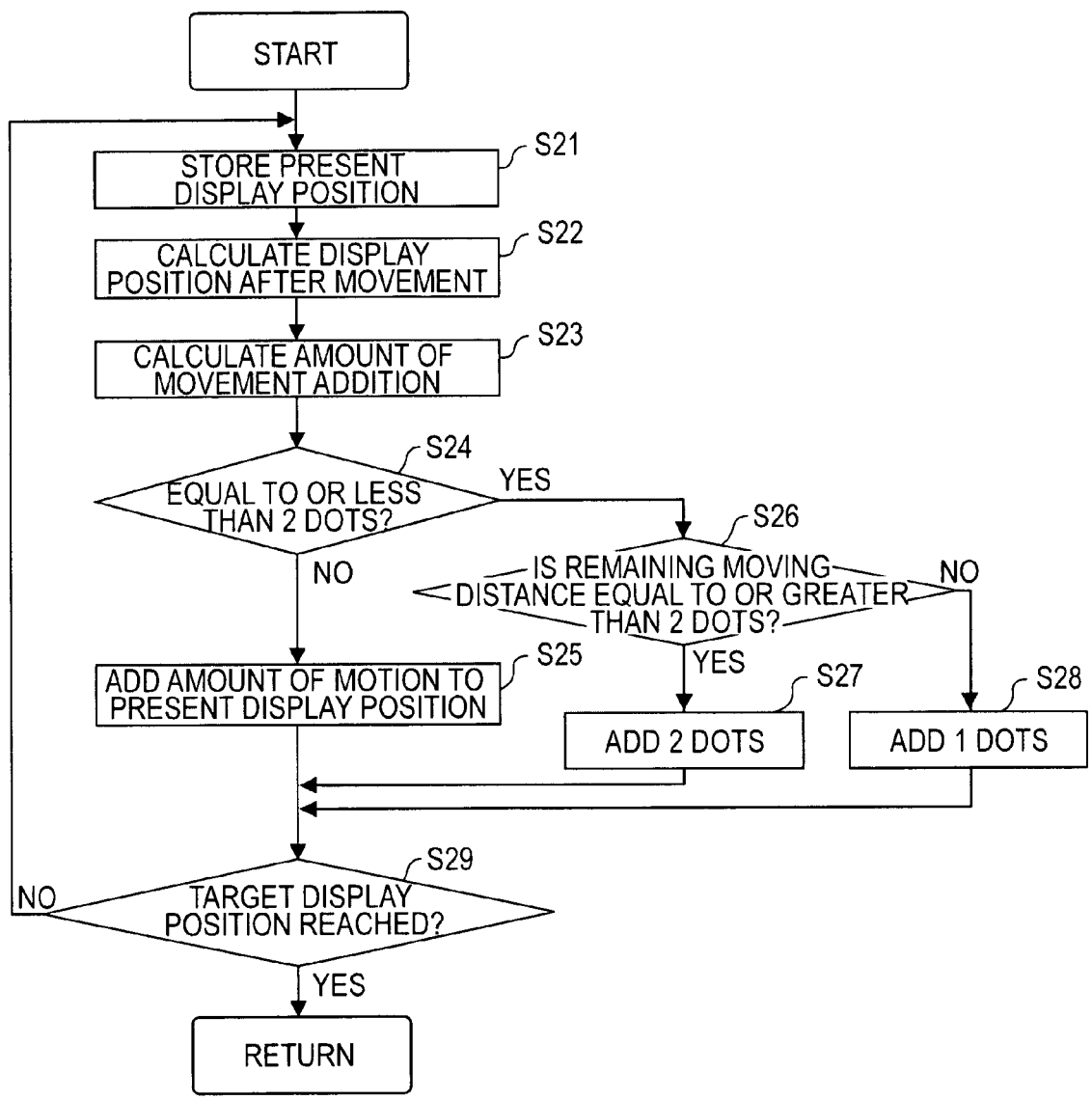
FIG. 9 is a flowchart illustrating a lower menu moving and displaying operation in the cellular phone according to the embodiment of the present invention.

The flow of control of the moving display is shown in the flowchart shown in FIG. 9. the flowchart in FIG. 9 indicates that, when the selected icon is changed, the control unit 11 functions as the list display section 21, and, in step S21, the present position of each lower menu is temporarily stored before the control unit 11 proceeds to step S22. In step S22, the control unit 11 that functions as the list display section 21 calculates the display position of the lower menu when it is moved, and proceeds to step S23. In step S23, the control unit 11 calculates the amount of "movement addition" by performing arithmetic operation on a moving ratio corresponding to ("Previous Display Position"–"Display Position after Movement")/the number of moving steps.

The moving ratio is a value representing, when a lower menu is moved in plural steps to a target display position, how many percent of the entire movement is performed in one step.

By way of example, the moving ratio is "8" for up to 4 steps, "12" for up to 8 steps, "32" for up to 12 steps, and "72" for up to 15 steps.

In terms of the example of the moving ratio, when the total amount of motion to a target display position is, for example, 100, the control unit 11 controls the lower menu to move by "100/8=12.5" per step up to four steps, and to move by "100/12=8.3" per step up to 84 steps.

Figure 10:
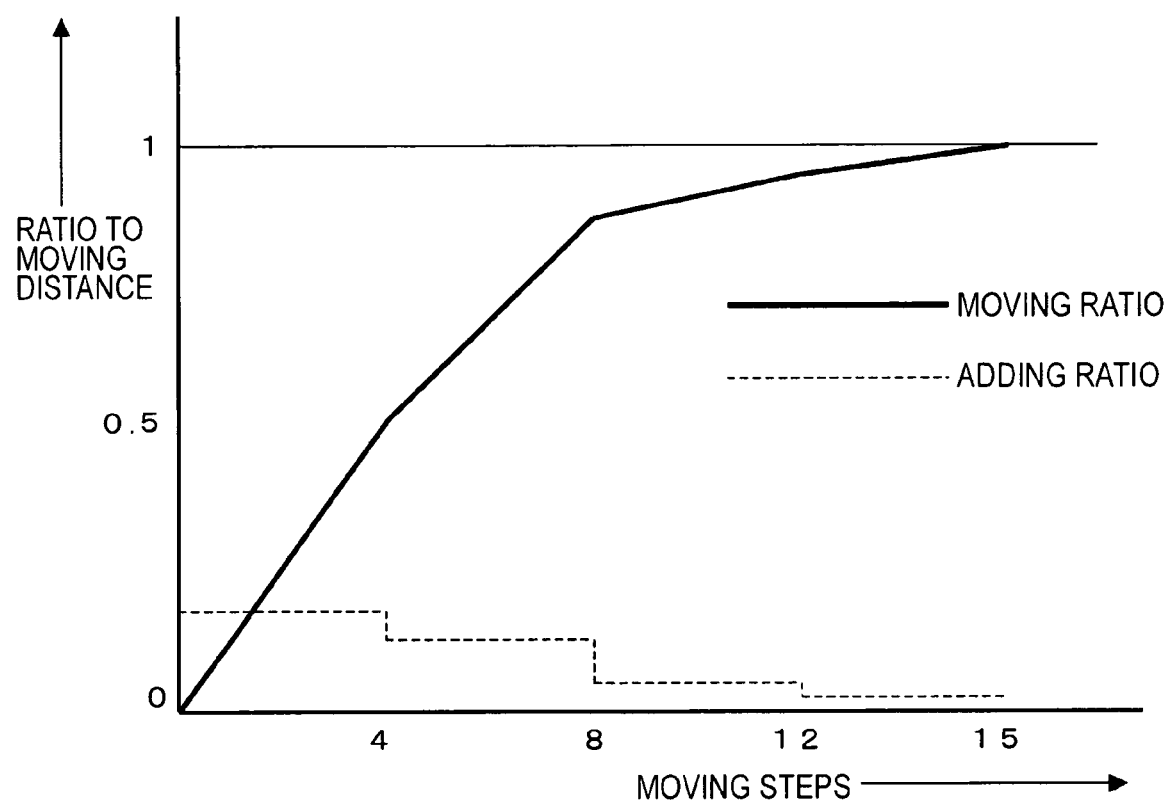
FIG. 10 is a graph showing a relationship between a moving ratio and the number of moving steps when a moving distance is 1.

The graph shown in FIG. 10 shows a relationship between a ratio to a moving distance and the number of moving steps when a moving distance is set to 1. In the graph in FIG. 10, the horizontal axis represents the number of moving steps, and the vertical axis represents a ratio to the moving distance. The solid ling indicates a moving ratio, and the broken line indicates an adding ratio.

The broken line in FIG. 10 indicates that the adding ratio is the greatest for up to the four steps where the moving ratio is "8", and gradually decreases for up to the eight steps when the moving ratio is "12", for up to the 12 steps when the moving ratio is "32", and for up to the 15 steps when the moving ratio is "72".

Accordingly, as indicated by the solid line in the graph in FIG. 10, the moving ratio is large for up to four steps. As the adding ratio gradually decreases for 8 steps, 12 steps, and 15 steps, also the moving ration gradually decreases.

It will be understood that, in the moving display control, moving of a lower menu is controlled so that the lower menu initially moves with a large amount of motion and moves with a gradually decreasing amount of motion to reach the target display position.

In step S24, the control unit 11 determines whether the "amount of motion" calculated in step S23 is equal to or less than 2 dots. When the "amount of motion" is a value greater than 2 dots, in step S25, the control unit 11 adds the "amount of motion", which is greater than 2 dots, to the present display position, and proceeds to step S29.

If the amount of motion is not equal to or less than 2 dots, the control unit 11 proceeds to step S26 and determines whether the remaining moving distance is equal to or greater than 2 dots. If the remaining moving distance is equal to or greater than 2 dots, in step S27, the control unit 11 adds 2 dots to the present display position before proceeding to step S29. If the remaining moving distance is not equal to or greater than 2 dots, the control unit 11 adds 1 dot to the present display position before proceeding to step S29. As described above, when the remaining moving distance decreases, by adjusting the movement addition in accordance with the remaining moving distance, each lower menu can be smoothly moved and displayed.

In step S29, the control unit 11 determines whether the lower menu reaches the target display position on the basis of the addition in step S24, S27, or S28. If it is determined that the lower menu does not reach the target display position, the control unit 11 returns to step S21 and re-executes processing in steps S21 to S28. If it is determined that the lower menu reaches the target display position, the control unit 11 is on standby until the key-input event is generated again.

In the above lower menu display control, the lower menu moves to the target display position in a predetermined number of steps. When the key-input event is generated while the lower menu is being moved, the lower menu moves in a predetermined number of steps over the sum of the remaining distance to the original display position and the next position to be displayed.

In addition, when key input is consecutively performed, a target display position for a lower menu is lengthened (the moving distance is lengthened). As described above, the number of steps in which the lower menu is moved is determined beforehand. Thus, the moving distance per step which is calculated by the control unit 11 increases. Accordingly, the longer the consecutive operating time, the gradually greater the moving distance of the lower menu.

In addition, regarding moving display of lower menu, similarly to the icon drawing, the target display position is reset for drawing when the key-input event is generated while the lower menu is being moved. In this case, by using a single event state to manage all the lower menus, a unified operation of the lower menus is realized. This enables the user to feel that the menu groups are looped and are seamlessly linked to one another.

Hierarchy Switching

Figure 11:
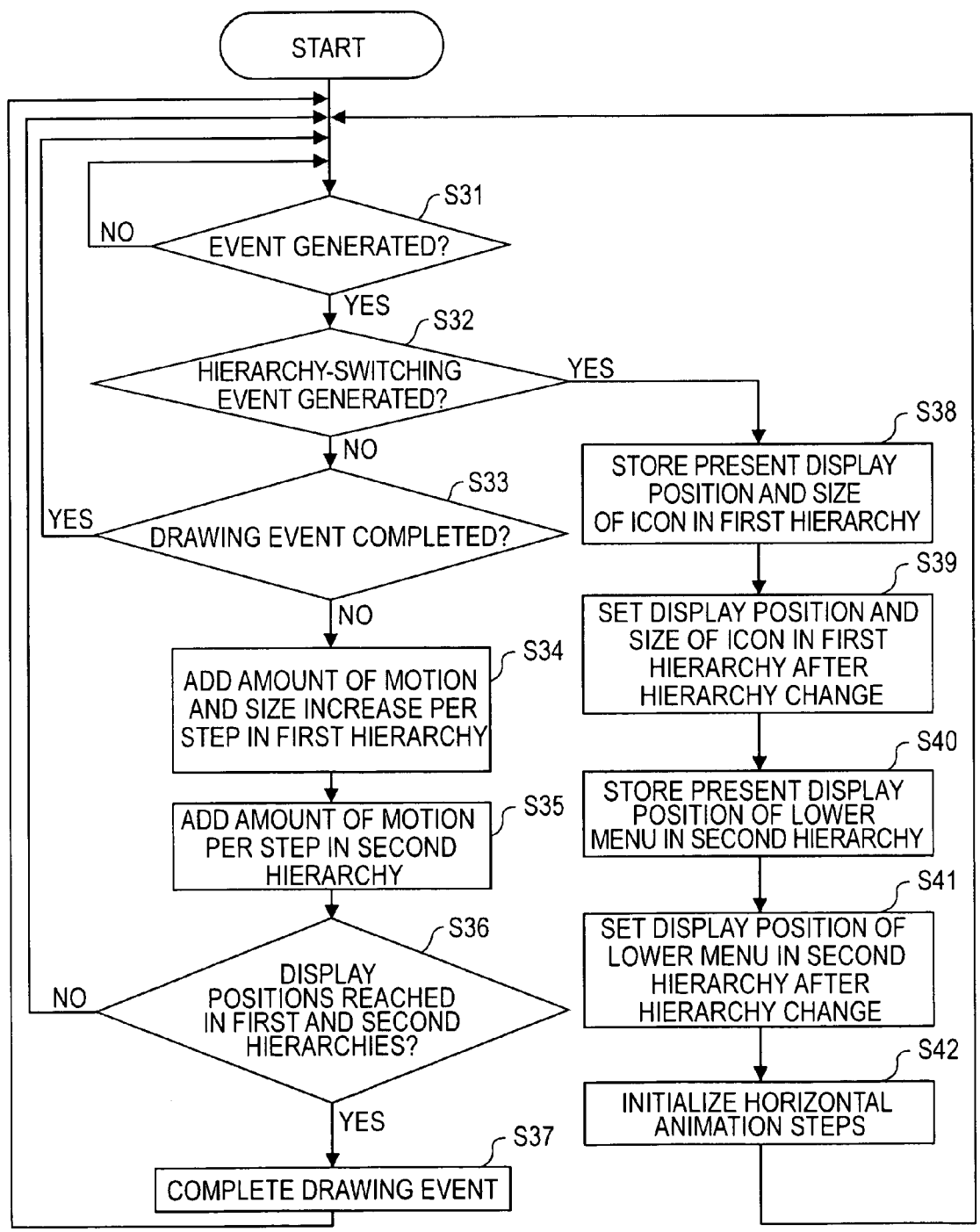
FIG. 11 is a flowchart illustrating a hierarchy switching operation in the cellular phone according to the embodiment of the present invention.

Regarding hierarchies (each icon is a first hierarchy and each lower menu is a second hierarchy) in which the user performs a selecting operation, an icon as a first hierarchy can be switched to a lower menu as a second hierarchy, and the lower menu can be switched to the icon. The flowchart shown in FIG. 11 shows the flow of operation in hierarchy switching.

In step S31, the control unit 11 determines whether the key-input event has been generated, and proceeds to step S32 at the time the control unit 11 detects the generation of the event. In step S32, the control unit 11 determines whether the event detected in step S31 is identified as a hierarchy switching event. If it is determined that the detected event is identified as the hierarchy switching event, the control unit 11 proceeds to step S38. If it is determined that the detected event is not the hierarchy switching event, the control unit 11 proceeds to step S33.

In other words, when switching a hierarchy in which a selecting operation is to be performed, the user rightward or leftward presses the cross key 48b in FIG. 4. the control unit 11 can receive a hierarchy switching event generated by pressing the cross key 48b.

After, in step S32, the control unit 11 determines that the detected event is not the hierarchy switching event, and proceeds to step S33, the control unit 11 determines whether a menu drawing event has been completed. If the menu drawing event has been completed, the control unit 11 directly returns to step S31 and performs monitoring concerning whether a key-input event has been generated.

If the menu drawing event has not been completed yet, in step S34, the control unit 11 adds the amount of motion and size increase per step in the first hierarchy. In step S35, the control unit 11 adds the amount of motion per step in the second hierarchy. In step S36, the control unit 11 determines whether the icon as the first hierarchy and the lower menu as the second hierarchy have reached target display positions, respectively. If it is determined that both have reached the target display positions, in step S37, the drawing event is completed.

After, in step S32, determining that the detected event is the hierarchy switching event, and proceeding to step S38, the control unit 11 temporarily stores the display position and size of the icon as the first hierarchy. In step S39, the control unit 11 sets the display position and size of the icon as the first hierarchy when it is moved to a different hierarchy.

In step S40, the control unit 11 temporarily stores the present display position of the lower menu as the second hierarchy. In step S41, the control unit 11 sets the display position of the lower menu as the second hierarchy when it is moved to a different hierarchy.

In step S42, the control unit 11 initializes lateral animation steps, and returns to step S31. In the above manner, at the time of the drawing event described in steps S33 to S37, the icon as the first hierarchy and the lower menu as the second hierarchy are drawn in the display position and size set in steps S38 to S42.

In cases in which the icon as the first hierarchy is selected and in which the lower menu as the second hierarchy is selected, the cellular phone according to this embodiment receives a menu switching event on a menu to be selected, sets a display position after the menu to be selected is switched, and simultaneously performs lengthwise movement and icon enlargement/reduction while performing lateral movement.

Since lateral movement is mainly performed in hierarchy switching, the amount of motion for one time of drawing can be calculated so that, when the lateral movement finishes, lengthwise animation processing is completely finished. In addition, irrespective of a halt and animation duration in movement setting, the same processing is performed. Accordingly, by setting zero as the amount of change when no lengthwise movement is performed, a problem of a change in lengthwise coordinate during movement is prevented.

Figure 12A:
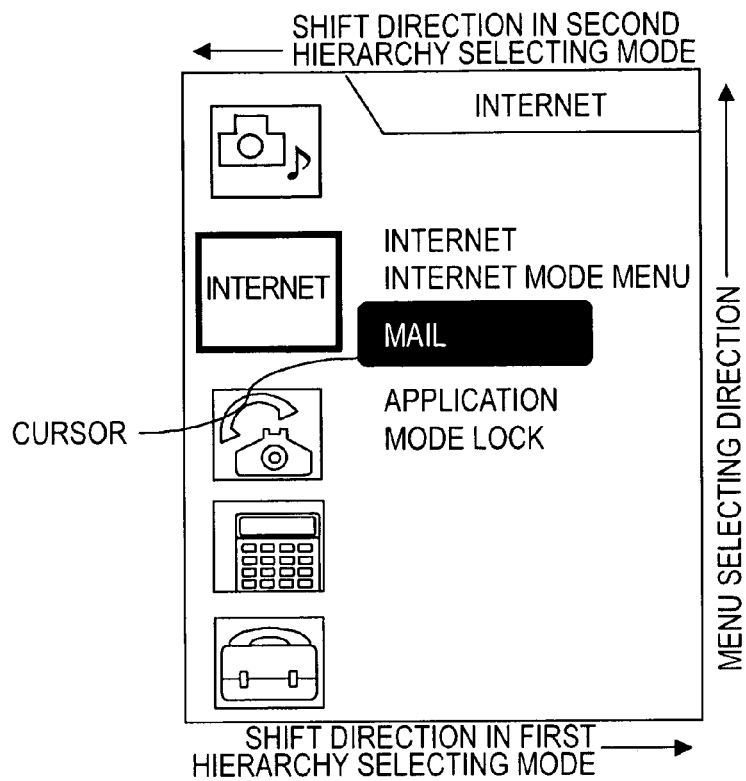
FIGS. 12A, 12B, and 12c are illustrations showing display forms of a cursor displayed when a lower menu is selected in the cellular phone according to the embodiment of the present invention.
Figure 12B:
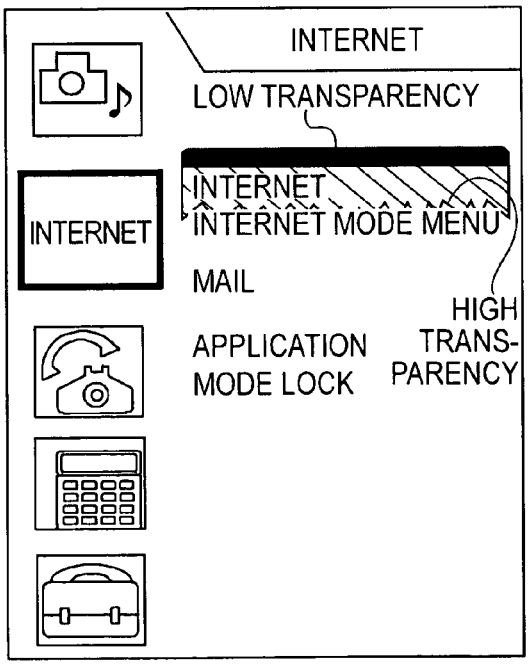
Figure 12C:
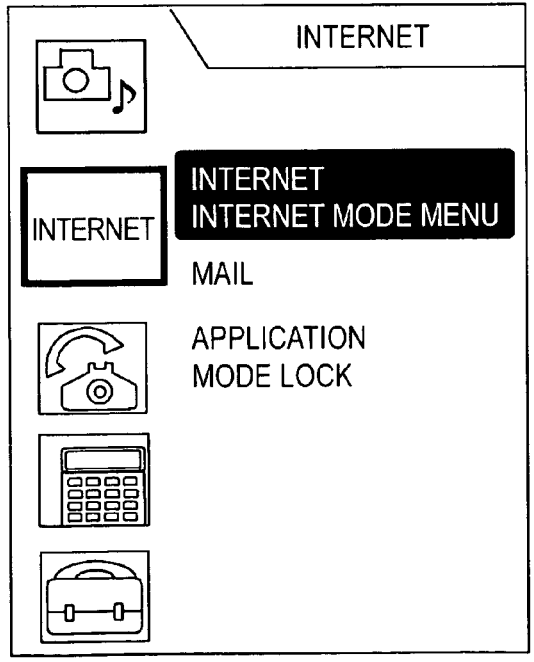

In this case, when the lower menu as the second hierarchy is selected, as shown in FIGS. 12A to 12C, the control unit 11 functions as the main displaying section 31 to display the icon as the first hierarchy closer to the left side of the display area and to display each lower menu as the second hierarchy at high luminance in a margin area formed thereby. Accordingly, since a selected menu as the second hierarchy can be displayed closer to the center of the display area, the user can be informed that the selected menu has been switched from the first hierarchy to the second hierarchy.

At this time, the control unit 11 displays all the icons in a form closer to the left side at lowered luminance or displays an icon selected from the icons at lowered luminance. Accordingly, the difference in luminance allows the user to know that the selected menu has been switched from the first hierarchy to the second hierarchy.

Conversely, when the icon as the first hierarchy is selected, the control unit 11 functions as the main displaying section 31 to display the lower menu as the second hierarchy in a form closer to the right side of the display area and to display, at high luminance, each icon as the first hierarchy in a margin area formed thereby. This can display the selected menu as the first hierarchy in a form closer to the center of the display area. Thus, the user can be informed that the selected menu has been switched from the second hierarchy to the first hierarchy.

At this time, the control unit 11 displays, as lowered luminance, each lower menu in a form closer to the right of the display area. Accordingly, the difference in luminance allows the user to know that the selected menu has been switched from the second hierarchy to the first hierarchy.

In this embodiment, the menu as the selected hierarchy is displayed at high luminance in a form closer to the center of the display area. However, the menu as the selected hierarchy may be displayed in enlarged form at high luminance in a form closer to the center of the display area while displaying a menu as a non-selected hierarchy in reduced form. This makes it possible to display the menu as the selected hierarchy in enlarged form, thus allowing the user to know the selected hierarchy.

Operation in the Case of Selecting Lower Menu as Second Hierarchy

In the case of the cellular phone according to this embodiment, when hierarchy switching to the lower menu as the second hierarchy is performed, the control unit 11 functions as the cursor display section 22 to display the cursor so that it is superimposed on a predetermined lower menu, as shown in FIG. 12A. In this case, the control unit 11 functions as the menu-display-color changing section 29 to change the display cooler of the lower menu so as to be viewed through the cursor.

The enter key 48a is upwardly or downwardly operated by the user, whereby the cursor is moved to select a desired lower menu. The control unit 11 functions as the cursor-operation detecting section 25 to detect the cursor moving direction. In addition, the control unit 11 functions as the cursor-display-form changing section 27, whereby, as shown in FIG. 12B, the cursor is displayed at gradually increasing transparency, and animation processing in which an afterimage is left in a direction opposite to the cursor moving direction is performed. When a focusing stopping operation is performed, the control unit 11 functions as the menu-display-color changing section 29, whereby, as shown in FIG. 12C, the display color of the lower menu is changed so as to be viewed through the cursor.

Figure 13:
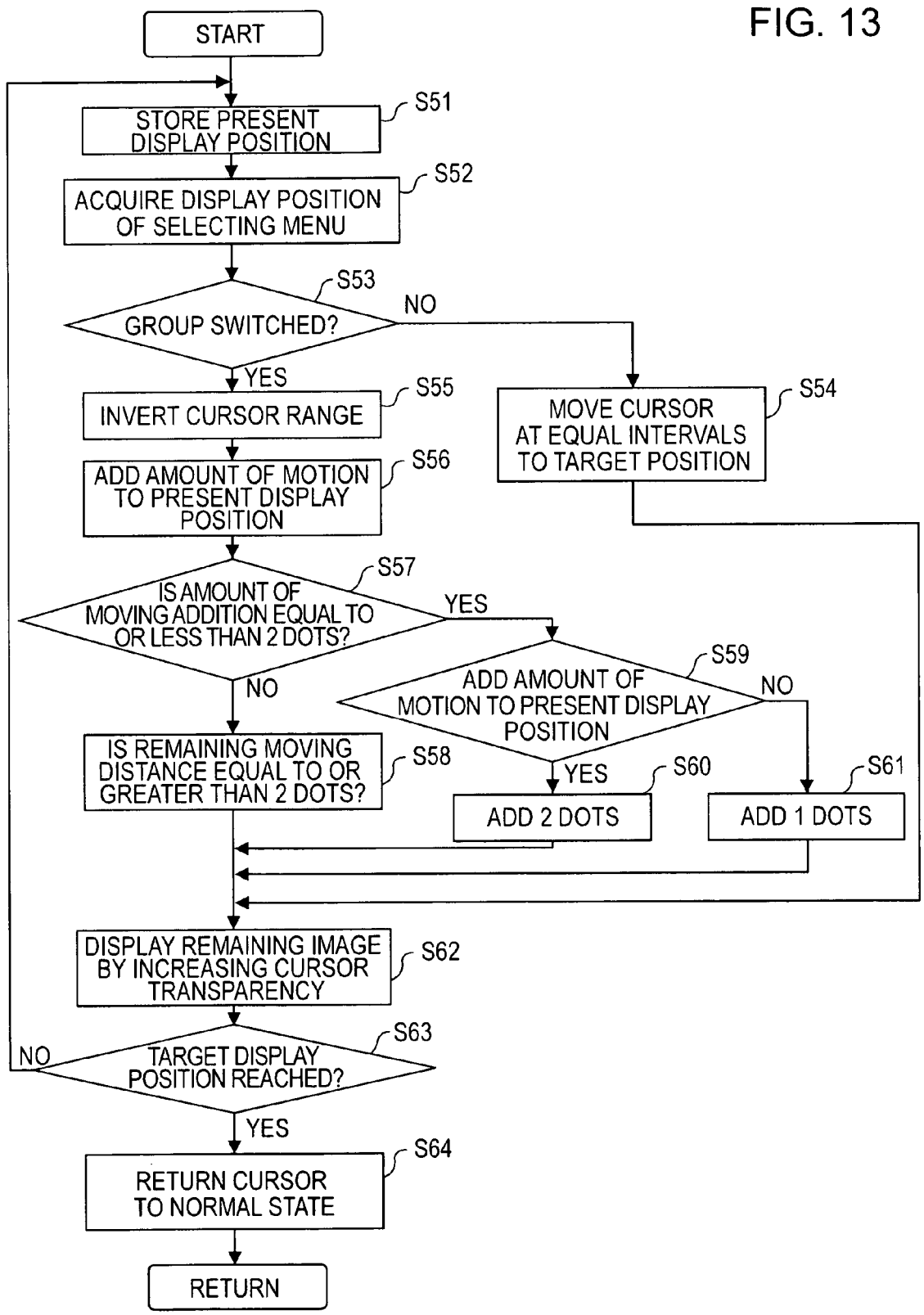
FIG. 13 is a flowchart illustrating the flow of display of a cursor displayed when a lower menu is selected in the cellular phone according to the embodiment of the present invention.

The flowchart shown in FIG. 13 shows the flow of the above display control. Referring to the flowchart in FIG. 13, when key input instructs the control unit 11 to change the display color of a lower menu to be selected, in step S51, the control unit 11 temporarily stores the present display position of the lower menu, and proceeds to step S52. In step S52, the control unit 11 acquires the display position of the lower menu when it is moved, and proceeds to step S53.

In step S53, the control unit 11 determines whether the menu group of the lower menu is switched by moving the cursor. If the menu group is switched, the control unit 11 proceeds to step S55. If the menu group is not switched, the control unit 11 proceeds to step S54. In step S54, the control unit 11 moves the cursor to the target display position at equal intervals, and proceeds to step S62.

If the menu group is switched, in step S55, the control unit 11 displays the cursor after inverting the orientation of the cursor range. In step S57, the control unit 11 adds the movement addition to the present display position, and proceeds to step S57.

In step S57, the control unit 11 determines whether the movement addition is equal to or less than 2 dots. If the movement addition is not equal to or less than 2 dots, in step S58, the control unit 11 adds, to the present display position, a movement addition as a value greater than the above 2 dots, and proceeds to step S62.

Conversely, when the movement addition is equal to or less than 2 dots, the control unit 11 proceeds to step S59 and determines whether the remaining distance is equal to or greater than 2 dots. If the remaining distance is equal to or greater than 2 dots, in step S60, the control unit 11 adds 2 dots to the present display position, and proceeds to step S62. If the remaining distance is not equal to or greater than 2 dots, in step S61, the control unit 11 adds 1 dot to the present display position. As described above, when the remaining amount of motion decreases, by adjusting the movement addition, each lower menu can be smoothly displayed and moved.

As shown in FIG. 12B, in step S62, the control unit 11 increases the transparency of focusing and performs animation processing for producing an after image. In step S63, the control unit 11 determines whether the display position of the cursor has reached the target display position. At the time the display position of the cursor has reached the target display position, the control unit 11 returns the focus of the cursor to a normal state as shown in FIG. 12C.

This enables the user to have a sense of speed for the displayed cursor in response to the user's operation of moving the cursor.

When the selected menu group is moved to a different menu group in response to a cursor moving operation, the control unit 11 functions as the group shifting section 28 to control the originally selected menu group to hide and to control each lower menu of the instead selected different menu group to be displayed. In addition, at the same time, animation processing is performed in a form following the lower menu. Furthermore, also an icon as the first hierarchy corresponding to the lower menu presently selected by the cursor is enlarged and displayed.

Figure 14A:
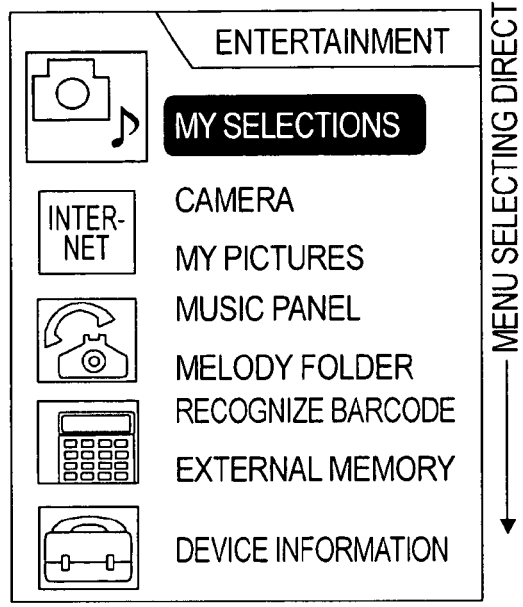
FIGS. 14A, 14B, and 14C are illustrations showing an operation in which, in the cellular phone according to the embodiment of the present invention, when lower menus are displayed in a display area at a time, the remaining lower menus are gradually displayed in response to moving the cursor.
Figure 14B:
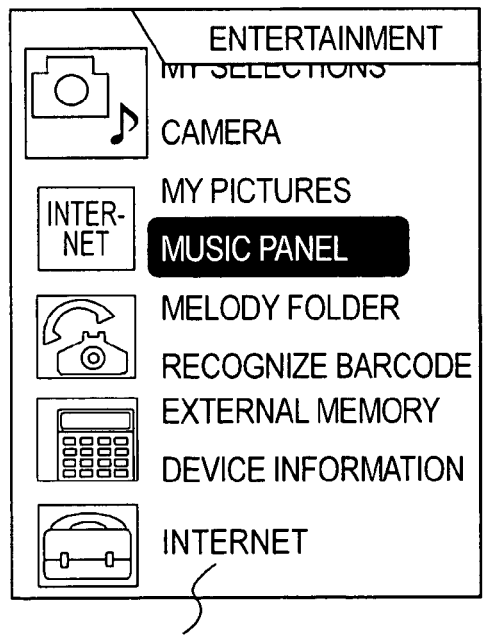
Figure 14C:
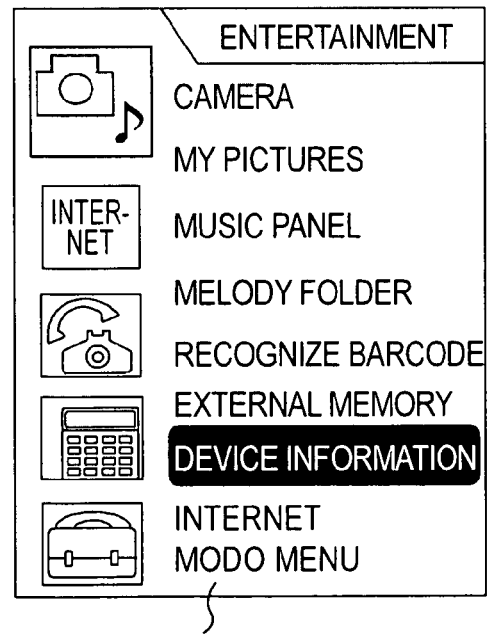

In addition, when it is difficult to display the lower menus of one menu group in the display area at a time, the control unit 11 functions as the menu shifting section 30, whereby, as shown in FIGS. 14A to 14C, by gradually displaying the entirety of the menu group in the display area, the remaining lower menus that are not displayed are gradually displayed in the display area. Accordingly, even if the bottom lower menu of the menu group is selected by using the cursor, lower menus of the next menu group can be viewed by the user.

Advantages of Embodiment

As is clear from the above description, the cellular phone according to the above embodiment has the following advantages.

1) The cellular phone receives a key-input event even during animation processing on a menu, whereby the cellular phone can quickly respond to key input from the user. Accordingly, improvement in the operability of the cellular phone can be achieved and inconvenience that causes the user to have stress when performing a key-input operation can be prevented.

2) By linearly enlarging an icon on the basis of its area, the icon is allowed to be three-dimensional, so that, by establishing the presence of an icon being selected, the icon is allowed to be easily identified by the user.

3) When a key-inputting interval shortens when selecting an icon, by increasing the moving speed of a lower menu as the second hierarchy for display, a cellular phone that quickly responds to user's key input can be provided.

4) When a menu stops after moving, by displaying the menu so that it moves at gradually decreasing moving speed and finally stops, the visibility of the menu when it moves can be improved, thus facilitating selecting a desired menu.

5) Since the cursor moves following movement of a lower menu, movement of a viewpoint can be supported, so that, when menu groups are switched, which menu is selected can be clearly displayed.

6) Although, in the case of an input device only capable of a pressing operation, a consecutive inputting operation is difficult, in the case of the cellular phone according to the above embodiment, a quick response to key input by the user is possible. Thus, the cellular phone can quickly respond to the user's consecutive operation, thus making it possible to considerably reduce stress the user feels when an input device only capable of a pressing operation is provided.

Although, in the above description of the embodiment, the embodiment of the present invention is applicable to cellular phones, the embodiment of the present invention may be applied to other types of portable terminal devices such as PHS and PDA.

Moreover, the above embodiment is only disclosed as an example of the present invention. Therefore, the present invention is not limited to the above embodiment, and embodiments of the present invention may be variously modified depending on design, etc., within a technical idea concerning the embodiments of the present invention, even if the embodiments of the present invention differ from the above embodiment.

What is claimed is:

1. A display method comprising:
    displaying step that displays a plurality of icons in list form on a display device by list-form displaying unit;
    an enlarging step that enlarges to a predetermined size step by step, a first icon selected by a user from the plurality of icons displayed on the display device;
    when a second icon is selected by the user, reducing the first icon to a size equal to the size of icons that are not selected step by step; and
    a controlling step that controls the enlarging step and the reducing step so that, when the second icon is selected by the user while the first icon is being enlarged, the first icon is first enlarged to the predetermined size step by step, and then is reduced to a size equal to the size of icons that are not selected step by step,
    wherein the controlling step controls the reducing of the first icon to be performed simultaneously with the enlarging of the second icon,
    wherein the plurality of icons are used as upper menus corresponding to menu groups which are each formed by grouping a plurality of lower menus displayed in list form along an arrangement direction of the upper menus;
    wherein:
    the lower menus are grouped correspondingly to each of the upper menus, and the lower menus have a ring structure having virtual connection of groups so that a lower menu at the end of one group is followed by a lower menu at the start of the next group when the lower menus are displayed;
    when one of the upper menus is selected with a cursor, lower menus corresponding to the selected upper menu is displayed with such transparency that the displayed lower menus are viewable by the user, and
    when a moving operation on the cursor from a presently selected upper menu to a different upper menu is detected, the lower menus of the group corresponding to the presently selected upper menu which are displayed with the transparency is hided in a form scrolled out of a display area of the display device, and, instead of the hidden lower menus, lower menus of a group corresponding to the different upper menu is displayed by scrolling, into the display area of the display device, the lower menus of the group corresponding to the different upper menu subsequent to the hidden lower menus.

2. The display method according to claim 1, further comprising an adjusting step that adjusts the display positions of the plurality of icons so that, in the step of displaying the plurality of icons, the plurality of icons are displayed in column form on the display device, and, after the first icon selected by the user is enlarged, all the plurality of icons displayed in list form are displayed in column form.

3. The display method according to claim 1, wherein:
in the step of displaying the plurality of icons, when the second icon is selected, the lower menus corresponding to the first icon are controlled to sequentially move out of a display area of the display device along the arrangement direction, and the lower menus corresponding to the second icon are controlled to sequentially move into the display area of the display device; and
the lower menus initially move at high speed along the arrangement direction then move at gradually decreasing speed and stop.

4. The display method according to claim 3, wherein, in displaying the plurality of icons, when different icons are sequentially selected by the user, displaying of lower menus corresponding to each of the different icons is controlled so that the lower menus corresponding to each of the different icons are moved at gradually increasing speed in accordance with a time in which the different icons are sequentially selected.

5. A portable terminal device comprising:
list-form displaying unit that displays a plurality of icons in list form;
an enlarging unit that enlarges, to a predetermined size step by step, a first icon selected with an operating unit by a user from the plurality of icons displayed on a display device by the list-form displaying unit;
reducing unit, when a second icon is selected with the operating unit by the user, that reduces the first icon selected and enlarged to the predetermined size to a size equal to the size of icons that are not selected step by step; and
a control unit, when the second icon is selected by the user while the first selected by the user is being enlarged by the enlarging unit, for controlling the enlarging unit to first enlarge the first icon step by step and then controls the reducing unit to reduce the enlarged icon to a size equal to the size of icons that are not selected step by step,
wherein the control unit controls the reducing of the first icon to be performed simultaneously with the enlarging of the second icon,
wherein the plurality of icons are used as upper menus corresponding to menu groups which are each formed by grouping plurality of lower menus displayed in list form along an arrangement direction of the upper menus;
wherein:
the lower menus are grouped correspondingly to each of the upper menus, and the lower menus have a ring structure having virtual connection of groups so that a lower menu at the end of one group is followed by a lower menu at the start of the next group when the lower menus are displayed:
when one of the upper menus is selected with a cursor, lower menus corresponding to the selected upper menu is displayed with such transparency that the displayed lower menus are viewable by the user, and
when a moving operation on the cursor from a presently selected upper menu to a different upper menu is detected, the lower menus of the group corresponding to the presently selected upper menu which are displayed with the transparency is hided in a form scrolled out of a display area of the display device, and, instead of the hidden lower menus, lower menus of a group corresponding to the different upper menu is displayed by scrolling, into the display area of the display device, the lower menus of the group corresponding to the different upper menu subsequent to the hidden lower menus.

6. The portable terminal device according to claim 5, further comprising a display-position adjusting unit that adjusts the display positions of the plurality of icons so that the list-form displaying unit displays the plurality of icons in column form, and, after the first icon selected by the user is enlarged, all the plurality of icons displayed in list form are displayed in column form.

7. The portable terminal device according to claim 5, wherein:
when the second icon is selected with the operating unit by the user, the lower menus corresponding to the first icon selected are controlled to sequentially move out of a display area of the display device along the arrangement direction, and the lower menus corresponding to the second icon are controlled to sequentially move into the display area of the display device; and
the controlled lower menus initially move at high speed along the arrangement direction, then move at gradually decreasing speed and stop.

8. The portable terminal device according to claim 7, wherein, when different icons are selected in a sequentially consecutive manner with the operating unit by the user, the lower menus corresponding to each of the different icons are moved at gradually increasing speed in accordance with a time in which the different icons are selected in the sequentially consecutive manner.

9. A computer-readable medium storing an executable program, when executed, causing a computer to display a plurality of icons, said executable program comprising:
displaying a plurality of icons in list form on a display device;
enlarging, to a predetermined size step by step, a first icon selected by a user from the plurality of icons;
when a second icon is selected by the user, reducing the first icon selected and enlarged to the predetermined size to a size equal to the size of icons that are not selected step by step; and
when the second icon is selected by the user while the first icon selected by the user is being enlarged, enlarging the first icon to the predetermined size step by step, and then reducing the enlarged icon to a size equal to the size of icons that are not selected step by step,
wherein the controlling step controls the reducing of the first icon to be performed simultaneously with the enlarging of the second icon,
wherein the plurality of icons are used as upper menus corresponding to menu groups which are each formed by grouping a plurality of lower menus displayed in list form along an arrangement direction of upper menus;
wherein:
the lower menus are grouped correspondingly to each of the upper menus, and the lower menus have a ring structure having virtual connection of groups so that a lower menu at the end of one group is followed by a lower menu at the start of the next group when the lower menus are displayed;
when one of the upper menus is selected with a cursor, lower menus corresponding to the selected upper menu is displayed with such transparency that the displayed lower menus are viewable by the user, and
when a moving operation on the cursor from a presently selected upper menu to a different upper menu is detected, the lower menus of the group corresponding to the presently selected upper menu which are displayed with the transparency is hided in a form scrolled out of a display area of the display device, and, instead of the hidden lower menus, lower menus of a group corresponding to the different upper menu is displayed by scrolling, into the display area of the display device, the lower menus of the group corresponding to the different upper menu subsequent to the hidden lower menus.

10. The executable program according to claim 9, further comprising:
adjusting the display positions of the plurality of icons so that the plurality of icons are displayed in list form and in column form, and, after the first icon selected by the user is enlarged, all the plurality of icons displayed in list form are displayed in column form.

11. The executable program according to claim 9, wherein:
when the second icon is selected by the user, the lower menus corresponding to the first icon selected are controlled to sequentially move out of a display area of the display device along the arrangement direction, and the lower menus corresponding to the second icon are controlled to sequentially move into the display area of the display device; and
the controlled lower menus initially move at high speed along the arrangement direction, then move at gradually decreasing speed and stop.

12. The executable program according to claim 11, wherein when different icons are selected in a sequentially consecutive manner by the user, the lower menus corresponding to each of the different icons are moved at gradually increasing speed in accordance with a time in which the different icons are selected in the sequentially consecutive manner.

13. A display method comprising:
a displaying step that displays at least a plurality of upper menus in column form on display device;
a displaying step that displays, in list form, along an arrangement direction of the plurality of upper menus displayed in column form, on the display device, lower menus corresponding to a selected upper menu;
a displaying step that displays, on the display device, a cursor for selecting a desired menu from the plurality of upper menus or the lower menus;
a detecting step that detects, by a moving operation detecting unit, a moving operation on the cursor from one of the plurality of upper menus to one of the lower menus, and a moving operation on the cursor from one of the lower menus to one of the plurality of upper menus, the moving operations being performed by a user;
when the moving operation on the cursor from one of the plurality of upper menus to one of the lower menus is detected, displaying all the plurality of upper menus in a form moved to a side opposite to the lower menus, and moving and displaying the lower menus in a margin area formed by moving the plurality of upper menus; and
when the moving operation from one of the lower menus to one of the plurality of upper menus is detected, displaying the lower menus by moving all the lower menus to a side opposite to the plurality of upper menus, and displaying the plurality of upper menus by moving the plurality of upper menus into a margin area formed by moving the lower menus,
wherein the moving operation of the upper menu or the lower menu is controlled so that the moving operation is terminated when reduction or enlargement of an upper menu or a lower menu is complete, wherein:
the lower menus are grouped correspondingly to each of the upper menus, and the lower menus have a ring structure having virtual connection of groups so that a lower menu at the end of one group is followed by a lower menu at the start of the next group when the lower menus are displayed;
when one of the upper menus is selected with the cursor, lower menus corresponding to the selected upper menu is displayed with such transparency that the displayed lower menus are viewable by the user, and
when a moving operation on the cursor from a presently selected upper menu to a different upper menu is detected, the lower menus of the group corresponding to the presently selected upper menu which are displayed with the transparency is hided in a form scrolled out of a display area of the display device, and, instead of the hidden lower menus, lower menus of a group corresponding to the different upper menu is displayed by scrolling, into the display area of the display device, the lower menus of the group corresponding to the different upper menu subsequent to the hidden lower menus.

14. The display method according to claim 13, wherein the step of displaying the upper menus and the lower menus by moving upper menus and the lower menus includes:
when the moving operation from one of the upper menus to one of the lower menus is detected, a moving step that moves all the upper menus to a side opposite to the lower menus, reduces the moved upper menus before displaying the moved upper menus, and enlarges the lower menus before displaying the lower menus; and
when the moving operation on the cursor from one of the lower menus to one of the upper menus is detected, a moving step that moves the all the lower menus to a side opposite to the upper menus, reduces the moved lower menus before displaying the moved lower menus, and enlarges the upper menus before displaying the upper menus.

15. The display method according to claim 13, wherein, in reducing the upper menus and enlarging the lower menus, the color of the cursor, a character color of the lower menus, or the color of the cursor and the character color of the lower menus are changed so that the lower menus are viewed through the cursor.

16. A portable terminal device comprising:
a menu displaying unit that displays a plurality of upper menus in column form on a display device, and for displaying, on the display device, in list form, along an arrangement direction of the upper menus displayed in column form, lower menus corresponding to a selected upper menu, and for displaying, on the display device, a cursor for selecting a desired menu from the upper menus or the lower menus;
a moving operation detecting unit that detects a moving operation on the cursor from one of the upper menus to one of the lower menus, and a moving operation on the cursor from one of the lower menus to one of the upper menus, the moving operations being performed with operating means by a user; and
a displaying processing unit that displays the upper menus in a form moved to a side opposite to the lower menus when the moving operation detecting unit detects the moving operation on the cursor from one of the upper menus to one of the lower menus, and moving and displaying the lower menus in a margin area formed by moving the upper menus, and for displaying, when the moving operation detecting unit detects the moving operation from one of the lower menus to one of the upper menus, the lower menus by moving all the lower menus to a side opposite to the upper menus, and the upper menus by moving the upper menus into a margin area formed by moving the lower menus, wherein the moving operation of the upper menu or the lower menu is controlled so that the moving operation is terminated when reduction or enlargement of an upper menu or a lower menu is complete, wherein:

the lower menus are grouped correspondingly to each of the tipper menus, and the lower menus have a ring structure having virtual connection of groups so that a lower menu at the end of one group is followed by a lower menu at the start of the next group when the lower menus are displayed:

when one of the upper menus is selected with the cursor, the displaying processing unit displays lower menus corresponding to the upper menu selected with the cursor with such transparency that the lower menus of the group corresponding to the selected upper menu are viewable by the user; and when a presently selected upper menu is changed to a different upper menu, the displaying processing unit hides the lower menus corresponding to the presently selected upper menu which are displayed with the transparency by scrolling, out of a display area of the display device, the lower menus corresponding to the presently selected upper menu in accordance with a moving operation direction of the cursor, and the displaying processing unit displays, instead of the hidden lower menus, lower menus corresponding to the different upper menu in the display area of the display device by scrolling the lower menus corresponding to the different upper menu subsequent to the hidden lower menus.

17. The portable terminal device according to claim 16, wherein:

when the moving operation detecting unit detects the moving operation on the cursor from one of the upper menus to one of the lower menus, the displaying processing unit displays the upper menus by moving all the upper menus to a side opposite to the lower menus and reducing the moved upper menus, and displays the lower menus after enlarging the lower menus; and when the moving operation on the cursor from one of the lower menus to one of the upper menus is detected by the moving operation detecting unit the displaying processing unit displays the lower menus after moving all the lower menus to a side opposite to the upper menus and reducing the moved lower menus, and displays the upper menus after enlarging the upper menus.

18. The portable terminal device according to claim 16, wherein, when the moving operation on the cursor from one of the upper menus to one of the lower menus is detected, the displaying processing unit changes the color of the cursor, a character color of the lower menus, or the color of the cursor and the character color of the lower menus so that the lower menus are viewed through the cursor.

19. A computer-readable medium recorded storing a display program, when executed, causing a computer to function as:

menu displaying means for displaying at least a plurality of upper menus in column form on display means, and in list form, in an arrangement direction of the upper menus displayed in column form, on the display means, lower menus corresponding to a selected upper menu, and for displaying, on the display means, a cursor for selecting a desired menu from the plurality of lower menus and the lower menus;

moving operation detecting means for detecting a moving operation on the cursor from one of the upper menus to one of the lower menus and a moving operation on the cursor from one of the plurality of lower menus to one of the upper menus, the moving operations being performed with operating means by a user; and displaying processing means for displaying, when the moving operation on the cursor from one of the upper menus to one of the lower menus is detected, the upper menus by moving all the upper menus to a side opposite to the lower menus, and for displaying, when the moving operation on the cursor from one of the lower menus to one of the upper menus is detected, by moving the lower menus into a margin area formed by moving the upper menus before displaying the moved lower menus, the lower menus by moving all the lower menus to a side opposite to the plurality of upper menus, and for displaying the upper menus by moving the upper menus into a margin area formed by moving the lower menus, wherein the moving operation of the upper menu or the lower menu is controlled so that the moving operation is terminated when reduction or enlargement of an upper menu or a lower menu is complete, wherein:

the lower menus are grouped correspondingly to each of the upper menus, and the lower menus have a ring structure having virtual connection of groups so that a lower menu at the end of one group is followed by a lower menu at the start of the next group when the lower menus are displayed;

when one of the upper menus is selected with the cursor is being detected, the displaying processing means displays lower menus corresponding to the selected upper menu with such transparency that the lower menus corresponding to the selected upper menu are viewable by the user; and when a presently selected upper menu to a different upper menu is detected, the displaying processing means hides lower menus of a group corresponding to the presently selected upper menu in accordance with a moving operation direction of the cursor by scrolling, out of a display area of the display means, the lower menus of the group corresponding to the presently selected upper menu, and, instead of the hidden lower menus, the displaying processing means displays lower menus corresponding to the different upper menu by scrolling, into the display area of the display means, the lower menus corresponding to the different menu subsequent to the hidden lower menus.

20. The display program according to claim 19, wherein, when the moving operation on the cursor from one of the upper menus to one of the lower menus is detected, all the upper menus are moved to a side opposite to the lower menus and are reduced before being displayed, and the lower menus are enlarged before being displayed, and when the moving operation on the cursor from one of the lower menus to one of the upper menus is detected, all the lower menus are moved to a side opposite to the upper menus and are reduced before being displayed, and the upper menus are enlarged before being displayed.

21. The display program according to claim 19, wherein, when the moving operation on the cursor from one of the upper menus to one of the lower menus is detected, the displaying processing means changes the color of the cursor, a character color of the lower menus, or the color of the cursor and the character color of the lower menus so that the lower menus are viewed through the cursor.

22. A portable terminal device comprising:
a list-form displaying section configured to display a plurality of icons in list form on a display device;
an enlarging section configured to enlarge, to a predetermined size step by step, a first icon selected with an operating device by a user from the plurality of icons displayed on the display device by the list-form displaying section;
a reducing section configured to, when a second icon is selected with the operating device by the user, reduce the first icon selected and enlarged to the predetermined size to a size equal to the size of icons that are not selected step by step; and
a control section configured to, when the second icon is selected by the user while the first icon selected by the user is being enlarged by the enlarging section, controls the enlarging section to first enlarge the first icon to the predetermined size step by step, and then controls the reducing section to reduce the enlarged icon to a size equal to the size of icons that are not selected step by step,
wherein the control section controls the reducing of the first icon to be performed simultaneously with the enlarging of the second icon,
wherein the plurality of icons are used as upper menus corresponding to menu groups which are each formed by grouping a plurality of lower menus displayed in list form along an arrangement direction of the upper menus;
wherein:
the lower menus are grouped correspondingly to each of the upper menus, and the lower menus have a ring structure having virtual connection of groups so that a lower menu at the end of one group is followed by a lower menu at the start of the next group when the lower menus are displayed;
when one of the upper menus is selected with the cursor, lower menus corresponding to the selected upper menu is displayed with such transparency that the displayed lower menus are viewable by the user, and
when a moving operation on the cursor from a presently selected upper menu to a different upper menu is detected, the lower menus of the group corresponding to the presently selected upper menu which are displayed with the transparency is hided in a form scrolled out of a display area of the display device, and, instead of the hidden lower menus, lower menus of a group corresponding to the different upper menu is displayed by scrolling, into the display area of the display device, the lower menus of the group corresponding to the different upper menu subsequent to the hidden lower menus.

23. A portable terminal device comprising:
a menu displaying section configured to display at least a plurality of upper menus in column form on a display device, and configured to display, on the display device, in list form, along an arrangement direction of the upper menus displayed in column form, lower menus of a menu group corresponding to a selected upper menu, and configured to display, on the display device, a cursor for selecting a desired menu from the upper menus or the lower menus;
a moving operation detecting section configured to detect a moving operation on the cursor from one of the upper menus to one of the lower menus, and a moving operation on the cursor from one of the lower menus to one of the upper menus, the moving operations being performed with an operating device by a user; and
a displaying processing section configured to display all the upper menus in a side opposite to the lower menus, when the moving operation detecting section detects the moving operation on the cursor from one of the upper menus to one of the lower menus, and display the lower menus by moving the lower menus into a margin area formed by moving the upper menus, and configured to display, when the moving operation detecting section detects the moving operation from one of the lower menus to one of the upper menus, the lower menus in a side opposite to the upper menus, and display the upper menus by moving the upper menus into a margin area formed by moving the lower menus,
wherein the moving operation of the upper menu or the lower menu is controlled so that the moving operation is terminated when reduction or enlargement of an upper menu or a lower menu is complete,
wherein:
the lower menus are grouped correspondingly to each of the upper menus, and the lower menus have a ring structure having virtual connection of groups so that a lower menu at the end of one group is followed by a lower menu at the start of the next group when the lower menus are displayed;
when one of the upper menus is selected with the cursor, lower menus correspondingly to the selected upper menu is displayed with such transparency that the displayed lower menus are viewable by the user, and
when a moving operation on the cursor from a presently selected upper menu to a different upper menu is detected, the lower menus of the group corresponding to the presently selected upper menu which are displayed with the transparency is hided in a form scrolled out of a display area of the display device, and, instead of the hidden lower menus, lower menus of a group corresponding to the different upper menu is displayed. by scrolling, into the display area of the display device, the lower menus of the group corresponding to the different upper menu subsequent to the hidden lower menus.

* * * * *